(12) United States Patent
Ashford

(10) Patent No.: US 8,556,162 B2
(45) Date of Patent: Oct. 15, 2013

(54) COMPONENT PROGRAMMING SYSTEM

(75) Inventor: Curtis M. Ashford, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 13/300,785

(22) Filed: Nov. 21, 2011

(65) Prior Publication Data

US 2013/0126595 A1    May 23, 2013

(51) Int. Cl.
  *G06F 17/00*      (2006.01)
(52) U.S. Cl.
  USPC .......................................................... 235/375
(58) Field of Classification Search
  USPC ........................ 235/375, 384, 472.01–472.03;
                        244/118.5; 725/75, 76, 145
  See application file for complete search history.

(56) References Cited

U.S. PATENT DOCUMENTS

| | | | |
|---|---|---|---|
| 5,610,824 A | 3/1997 | Vinson et al. | |
| 5,809,639 A | 9/1998 | Alvite | |
| 6,606,528 B1 | 8/2003 | Hagmeier et al. | |
| 6,647,303 B1 | 11/2003 | Johnson et al. | |
| 7,023,432 B2 | 4/2006 | Fletcher et al. | |
| 7,597,286 B2 * | 10/2009 | Callahan et al. | 244/118.5 |
| 7,778,794 B2 | 8/2010 | Davies et al. | |
| 7,814,441 B2 | 10/2010 | Bae et al. | |
| 7,814,515 B2 * | 10/2010 | Ohyama et al. | 725/75 |
| 7,831,543 B2 | 11/2010 | Milstead et al. | |
| 7,920,943 B2 | 4/2011 | Campbell et al. | |
| 2004/0243481 A1 | 12/2004 | Bradbury et al. | |
| 2008/0079729 A1 | 4/2008 | Brailovsky | |
| 2010/0071201 A1 | 3/2010 | Chida et al. | |
| 2010/0205121 A1 | 8/2010 | Quadracci et al. | |
| 2010/0205192 A1 | 8/2010 | Quadracci et al. | |
| 2010/0205212 A1 | 8/2010 | Quadracci et al. | |
| 2011/0300880 A1 * | 12/2011 | Muller et al. | 455/456.1 |
| 2012/0071998 A1 | 3/2012 | Davies et al. | |
| 2012/0174165 A1 * | 7/2012 | Mondragon et al. | 725/75 |

OTHER PUBLICATIONS

Office Action, dated Sep. 24, 2012, regarding USPTO U.S. Appl. No. 12/884,261, 12 pages (10-0513-US-NP).
Notice of Allowance, dated Dec. 11, 2012, regarding USPTO U.S. Appl. No. 12/884,282, 7 pages (10-0535-US-NP).
Baker et al., "Object Management System", U.S. Appl. No. 12/884,261 (10-0513-US-NP) filed Sep.17, 2010, 62 pages.
USPTO Final Office Action dated May 23, 2012 for U.S. Appl. No. 12/884,282 (10-0535-US-NP), 14 pages.
USPTO Office Action dated Jan. 20, 2012 for U.S. Appl. No. 12/884,282 (10-0535-US-NP), 19 pages.
U.S. Appl. No. 12/884,261, filed Sep. 17, 2010, Baker et al.
U.S. Appl. No. 12/884,282, filed Sep. 17, 2010, Davies et al.
Notice of allowance dated May 6, 2013 regarding U.S Appl. No. 12/884,282, 10 pages (10-0535-US-NP).
PCT search report dated Mar. 15, 2013, regarding application PCT/US12/61107, international filed Oct. 19, 2012 reference 11-0846PCT, applicant The Boeing Company, 10 pages.

* cited by examiner

*Primary Examiner* — Seung Lee
(74) *Attorney, Agent, or Firm* — Yee & Associates, P.C.

(57) ABSTRACT

A method and apparatus for managing a programmable component may be present. A location on an object may be identified using a programming unit based on a position of the programming unit with respect to the object. Programming information for the programmable component may be identified based on the location on the object. The programmable component may be programmed using the programming information for the programmable component.

24 Claims, 15 Drawing Sheets

FIG. 16
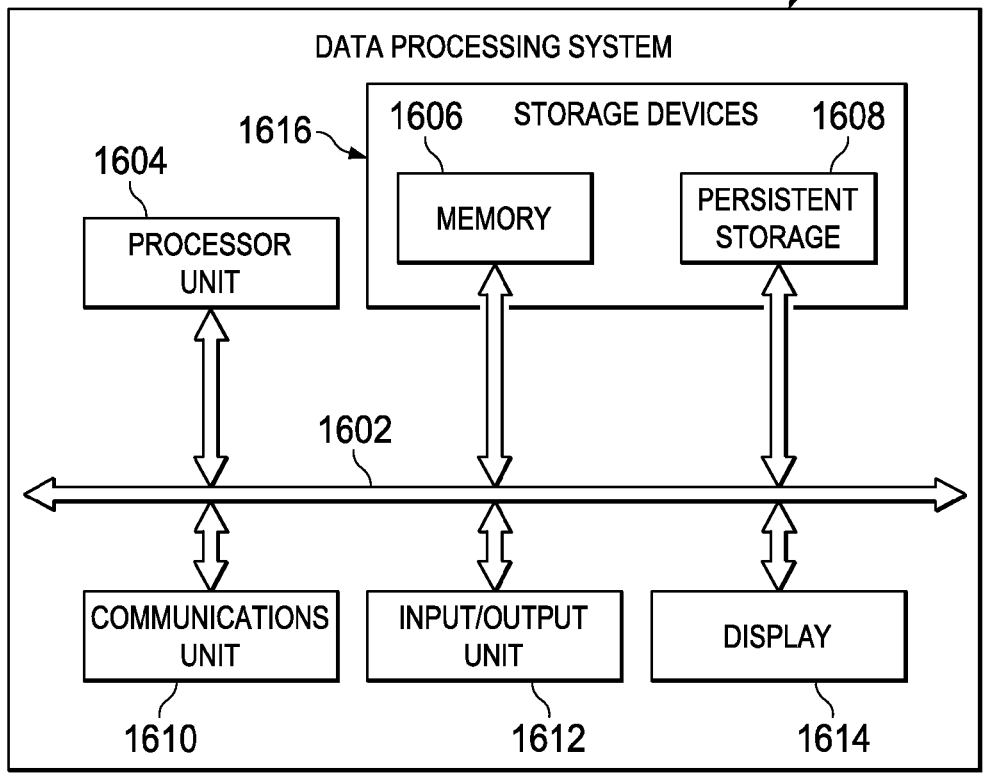
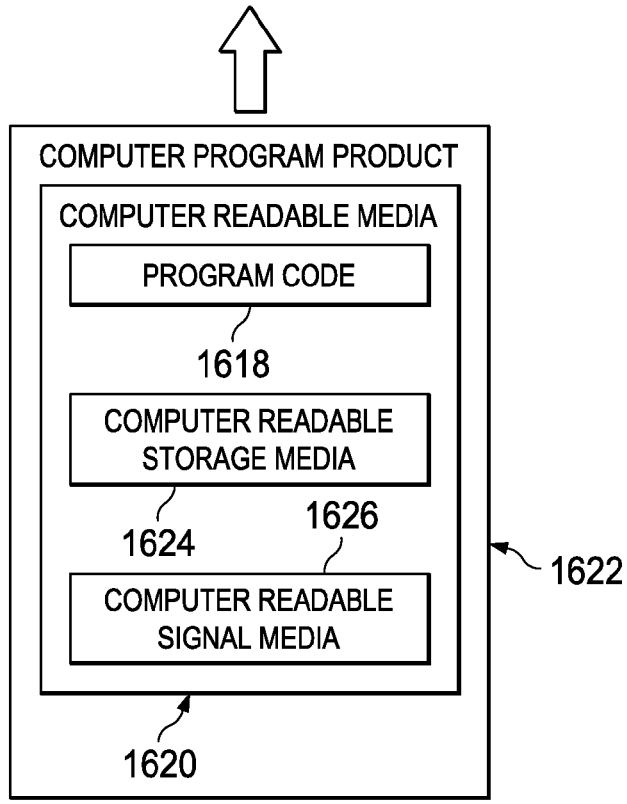

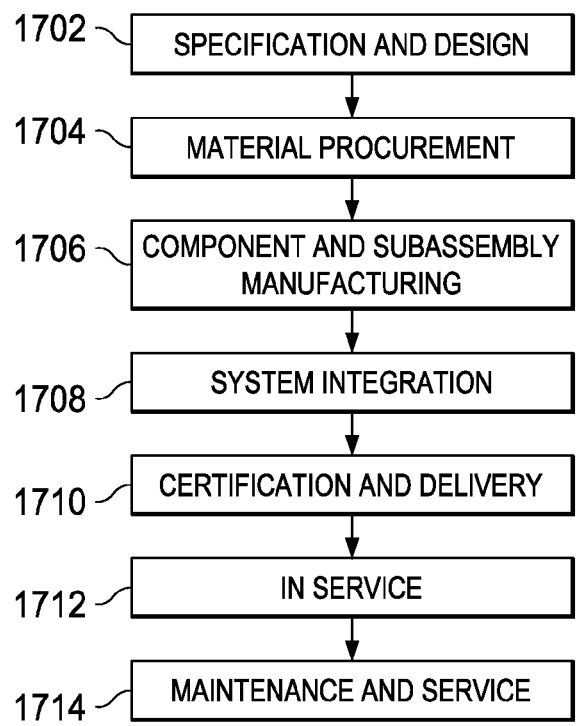
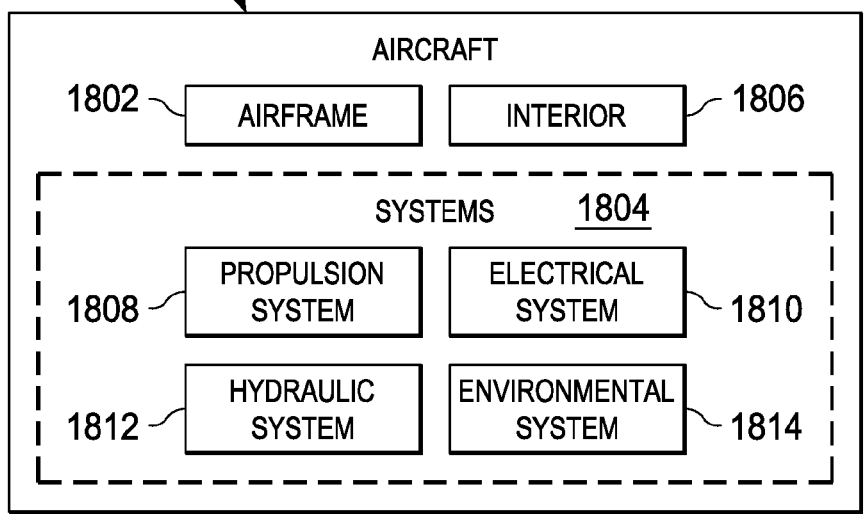

COMPONENT PROGRAMMING SYSTEM

CROSS-REFERENCE TO RELATED APPLICATION

This application is related to the following patent application entitled "Object Management System", Ser. No. 12/884,261, filed Sep. 17, 2010, and the patent application entitled "Point Cloud Generation System", Ser. No. 12/884,282, filed Sep. 17, 2010, assigned to the same assignee, and incorporated herein by reference.

BACKGROUND INFORMATION

1. Field

The present disclosure relates generally to managing objects and, in particular, to programming components in objects. Still more particularly, the present disclosure relates to a method and apparatus for programming components based on locations for the components in an object.

2. Background

Typically, manufacturing structures for objects involves assembling numerous parts together to form the structures. For example, during the manufacturing of an aircraft, parts may be assembled to form different structures for the aircraft. For example, a wing of an aircraft may have skin panels, spars, ribs, fasteners, and other suitable types of parts. Further, sensors, controls, and other components may be installed in the aircraft. With the large number of parts used to assemble an aircraft, operators may perform numerous operations to assemble and/or configure the parts for the aircraft.

For example, without limitation, with sensors, environmental controls, switches, lights, and other components, operators may install wires between these different components. For example, a wire may connect a switch to a light. Additionally, a control panel may be connected to an in-flight entertainment system in the cabin.

This process may take more time than desired. An operator may misidentify a part and/or connection between parts with this type of process. For example, without limitation, if an operator connecting switches to lights in an aircraft cabin misidentifies a light switch and light pairing, the operator may connect wires for a light switch to an incorrect light. Inspections after the operations have occurred may be performed to verify wiring connections between components. When an inspection identifies the incorrect connection between the light switch and the light, rework of the wiring connections between the different components may need to be performed. This situation may increase the time and cost for performance of these operations.

Therefore, it would be desirable to have a method and apparatus that takes into account at least some of the issues discussed above, as well as possibly other issues.

SUMMARY

In one illustrative embodiment, a method for managing a programmable component may be present. A location on an object may be identified using a programming unit based on a position of the programming unit with respect to the object. Programming information for the programmable component may be identified based on the location on the object. The programmable component may be programmed using the programming information for the programmable component.

In another illustrative embodiment, an apparatus may comprise a programming unit and a component manager. The programming unit may be configured to identify a location on an object based on a position of the programming unit with respect to the object. The component manager may be configured to identify programming information for a programmable component based on the location on the object. The component manager may be further configured to program the programmable component using the programming information for the programmable component.

In yet another illustrative embodiment, a method for programming a programmable component in an aircraft may be present. A programming unit may be pointed at a location on an object in the aircraft. The location on the object may be identified based on a position of the programming unit pointed at the programmable component and a distance between the programming unit and the location on the object. Programming information may be identified for the programmable component based on the location on the object by identifying an association between the location on the object and a number of points in a point cloud for the object and identifying the programming information for the programmable component using the component identification associated with the number of points in the point cloud and the database. The number of points in the point cloud may be associated with a component identification stored in a database. The programming information may comprise at least one of an identifier, control code, a program, and a configuration file. The programmable component may be programmed using the programming information for the programmable component by sending the programming information to the programmable component over a communications link with the programmable component or sending the programming information to the programmable component by a human operator. The programmable component may be selected from one of a switch, a sensor, an in-flight entertainment unit, a light, and a controller.

Identifier information may be obtained for the programmable component over the communications link established with the programmable component. The identifier information may comprise at least one of a media access code, a serial number, a part number, a processor serial number, a model number, an identification of a type of component, and a code.

In yet another illustrative embodiment, an aircraft component programming system may comprise a programming unit and a component manager. The programming unit may be configured to be pointed at a location on an object in an aircraft. The programming unit may be further configured to identify the location on the object based on a position of the programming unit with respect to the object. The programming unit may be configured to obtain identifier information for a programmable component over a communications link established with the programmable component. The programmable component may be selected from one of a switch, a sensor, an in-flight entertainment unit, a light, and a controller. The identifier information may be selected from at least one of a media access code, a serial number, a part number, a processor serial number, a model number, an identification of a type of component, and a code. The component manager may be configured to identify programming information for the programmable component based on the location on the object by identifying an association between the location on the object and a number of points in a point cloud for the object and identifying the programming information for the programmable component using the component identification associated with the number of points in the point cloud and the database. The number of points in the point cloud may be associated with a component identification stored in a database. The programming information may comprise at least one of an identifier, a control code, a program, and a configuration file. The component manager may be further configured to program the programmable component using the programming information for the programmable component by sending the programming information to the programmable component over the communications link established with the programmable component or sending the programming information to the programmable component by a human operator.

The features and functions can be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 16 is an illustration of a data processing system in accordance with an illustrative embodiment;

FIG. 17 is an illustration of an aircraft manufacturing and service method in accordance with an illustrative embodiment; and FIG. 18 is an illustration of an aircraft in which an illustrative embodiment may be implemented.

DETAILED DESCRIPTION

The different illustrative embodiments recognize and take into account one or more different considerations. For example, the different illustrative embodiments recognize and take into account that rather than relying on direct connections between components, components may be configured to interact with each other. The different illustrative embodiments recognize and take into account that one component may be programmed to recognize another component and interact with that component. The communication between those two components may be performed through a network, wireless connections, or some other suitable type of media. In this manner, components may be movable to different locations and reprogrammed as desired.

The different illustrative embodiments also recognize and take into account that the programmability of components may reduce the amount of time needed to install the components. The different illustrative embodiments recognize and take into account, however, that programming the components may require more time than desired.

Therefore, the different illustrative embodiments may provide a method and apparatus for managing a component. In one illustrative embodiment, a method for managing a programmable component may be present. A location on an object may be identified using a programming unit based on a position of the programming unit with respect to the object. Programming information for the programmable component may be identified based on the location on the object. The programmable component may be programmed using the programming information for the programmable component.

Figure 1:
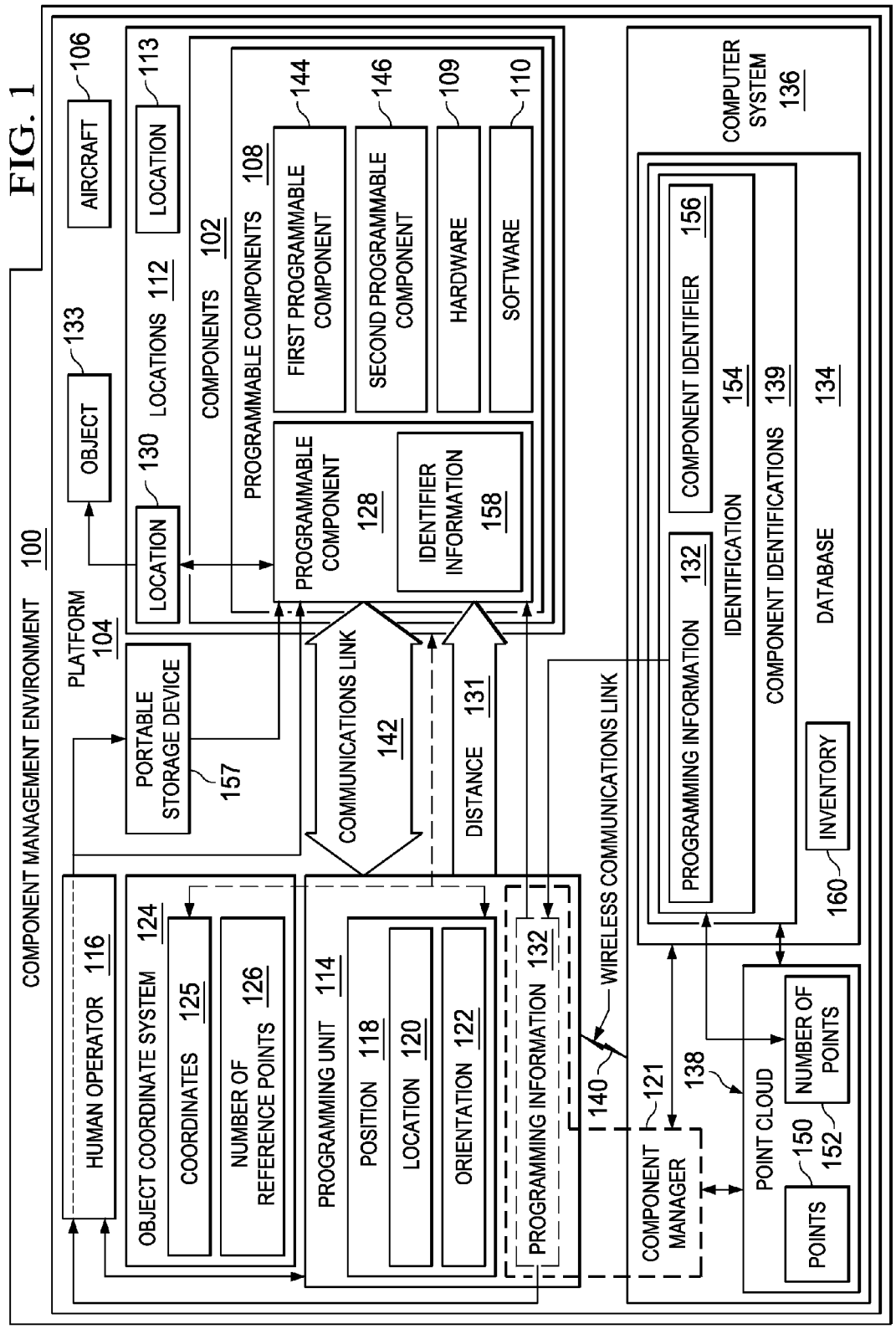
FIG. 1 is an illustration of a component management environment in accordance with an illustrative embodiment.

With reference now to the figures and, in particular, with reference to FIG. 1, an illustration of a component management environment is depicted in accordance with an illustrative embodiment. In this illustrative example, component management environment 100 may be an environment in which components 102 for platform 104 may be managed. In this illustrative example, platform 104 may take the form of aircraft 106. In these illustrative examples, components 102 may be programmable components 108. As used herein, a "programmable component" may be any component or device that may be programmed to operate in a desired manner.

Programmable component 128 may be an example of one of programmable components 108. Programmable component 128 may take a number of different forms. For example, without limitation, programmable component 128 may take the form of a switch, a controller, a sensor, a computer, an environmental control unit, an in-flight entertainment unit, a light, or some other suitable type of device that may be programmable.

Further, programmable component 128 may include hardware 109, software 110, or a combination of the two. In some cases, hardware 109 and/or software 110 may allow programmable component 128 to be programmed to interact with other programmable components in programmable components 108 in a desired manner.

For example, without limitation, programming programmable components 108 may generate associations between programmable components 108 that allow programmable components 108 to interact with each other. In these illustrative examples, one component interacting with another component may include a number of different actions. As one illustrative example, first programmable component 144 in programmable components 108 may require programming to interact with second programmable component 146 in programmable components 108. First programmable component 144 interacting with second programmable component 146 may include, for example, without limitation, first programmable component 144 sending a command to, receiving a command from, sending information to, receiving information from, and performing other suitable actions in association with second programmable component 146.

In these illustrative examples, the programming of programmable components 108 may depend on locations 112 in platform 104 selected for programmable components 108. For example, without limitation, locations 112 may be the locations at which programmable components 108 are to be installed in platform 104 and the locations at which programmable components 108 have already been installed in platform 104.

Locations 112 in platform 104 may include locations on one or more objects in platform 104. As one illustrative example, location 130 of locations 112 in platform 104 may be a location on object 133. Object 133 may be an object in platform 104. For example, without limitation, when platform 104 takes the form of aircraft 106, object 133 may be a storage cabinet, an overhead bin, a seat, or some other suitable type of object in aircraft 106.

In other examples, object 133 may be or may form part of aircraft 106. For example, without limitation, object 133 may be a fuselage for aircraft 106, a surface of aircraft 106, or a wing of aircraft 106.

In some illustrative examples, at least some of programmable components 108 may be interchangeable with each other in at least some of locations 112. For example, without limitation, first programmable component 144 and second programmable component 146 may be a same type of component. Location 113 of locations 112 in platform 104 may be designated for this particular type of component.

As a result, either first programmable component 144 or second programmable component 146 may be selected for installation at location 113 prior to these two programmable components being programmed. Once one of these two programmable components has been selected for location 113 in platform 104, the programmable component selected may then be programmed based on location 113.

In these illustrative examples, component manager 121 may be configured to manage programmable components 108. Component manager 121 may be implemented in hardware, software, or a combination of the two. Further, component manager 121 may be implemented in programming unit 114, computer system 136, or a combination of the two.

Programming unit 114 may be a portable system. For example, without limitation, programming unit 114 may take the form of a handheld computer configured to be held and carried by an operator, such as human operator 116. Computer system 136 may be one or more computers. When more than one computer is present in computer system 136, these computers may be in communication with each other through a medium, such as a network.

In one illustrative example, a portion of component manager 121 may be implemented in programming unit 114, while another portion of component manager 121 may be implemented in computer system 136. Programming unit 114 and computer system 136 may be configured to communicate using wireless communications link 140. In this manner, the portion of component manager 121 implemented in programming unit 114 may be configured to communicate and exchange information with the portion of component manager 121 implemented in computer system 136.

Component manager 121 may be configured to identify the programming information needed to program programmable components 108 based on locations 112 in platform 104. In these illustrative examples, locations 112 may be identified with respect to object coordinate system 124. In particular, locations 112 may be identified using coordinates 125 in object coordinate system 124.

In some illustrative examples, coordinates 125 in object coordinate system 124 may be based on number of reference points 126 in platform 104. As used herein, a "number of" items means one or more items. As one illustrative example, number of reference points 126 may be one or more reference points. In other illustrative examples, object coordinate system 124 may be defined by a model for platform 104, such as, for example, without limitation, a computer-aided design (CAD) model for platform 104.

In these illustrative examples, component manager 121 may be configured to obtain identifications of locations 112 using programming unit 114. Programming unit 114 may be configured to identify one of locations 112 based on position 118 of programming unit 114. Position 118 may be a position in platform 104 and/or a position with respect to an object in platform 104, such as object 133.

Position 118 may include location 120 of programming unit 114 and/or orientation 122 of programming unit 114 in these illustrative examples. Location 120 of programming unit 114 may be identified with respect to object coordinate system 124.

Programming unit 114 may identify position 118 in a number of different ways. For example, without limitation, programming unit 114 may be placed at a reference point in number of reference points 126 or may be pointed at a reference point in number of reference points 126 to identify location 120 of programming unit 114 using coordinates 125 in object coordinate system 124. Movement of programming unit 114 within platform 104 may result in programming unit 114 reidentifying location 120 using coordinates 125 for object coordinate system 124.

In one illustrative example, human operator 116 may point programming unit 114 at one of locations 112, such as, for example, without limitation, location 130 on object 133 in platform 104. Programming unit 114 may identify location 130 with respect to object coordinate system 124 based on position 118 of programming unit 114 with respect to object 133 with programming unit 114 pointed at location 130. Further, programming unit 114 may also use distance 131 between programming unit 114 and location 130 to identify location 130.

Component manager 121 may use location 130 identified by programming unit 114 to identify the programming information needed to program one of programmable components 108 for use at location 130. In particular, component manager 121 may associate location 130 on object 133 with number of points 152 in points 150 in point cloud 138.

Points 150 in point cloud 138 may represent the components for use in platform 104. In these illustrative examples, points 150 may be defined using coordinates 125 in object coordinate system 124. Number of points 152 associated with location 130 may be one or more points in points 150 in point cloud 138 that are closest to location 130 with respect to object coordinate system 124.

Points 150 may be associated with component identifications 139. Component identifications 139 may be stored in database 134. In one illustrative example, number of points 152 associated with location 130 on object 133 may be associated with identification 154 in component identifications 139.

In these illustrative examples, identification 154 may include component identifier 156. Component identifier 156 may include at least one of a media access code, a serial number, a part number, a processor serial number, a model number, an identification of a type of component, a code, and other suitable information.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Component identifier 156 may be used to identify which of programmable components 108 belongs at location 130 on object 133. In this illustrative example, component identifier 156 may indicate that programmable component 128 belongs at location 130. In this manner, points 150 in point cloud 138 may be associated with and/or represent components 102.

Further, in these illustrative examples, identification 154 may also include programming information 132. Component manager 121 may retrieve programming information 132 from database 134 and associate programming information 132 with location 130 on object 133. More specifically, component manager 121 may use programming information 132 to program programmable component 128 for use at location 130 on object 133.

Of course, in other illustrative examples, programming information 132 may not be included in identification 154 but may be associated with identification 154 in database 134. Component manager 121 may associate location 130 with number of points 152 to obtain identification 154 and use identification 154 to obtain programming information 132.

Component manager 121 may be configured to manage database 134, programming information 132 in database 134, component identifications 139, point cloud 138, and/or other suitable information for use in managing programmable components 108. Depending on the implementation, component manager 121 may be configured to retrieve and store at least a portion of the information stored in database 134 in programming unit 114. For example, without limitation, component manager 121 may be configured to retrieve and store programming information 132 for programmable component 128 in programming unit 114.

Programmable component 128 may be programmed using programming information 132 in a number of different ways. In one illustrative example, component manager 121 may use programming information 132 to program programmable component 128. For example, without limitation, component manager 121 may send programming information 132 to programmable component 128 from programming unit 114 using communications link 142. Communications link 142 may be selected from one of a wired communications link, a wireless communications link, an optical communications link, or some other suitable type of communications link.

As another example, programming information 132 stored in programming unit 114 by component manager 121 may be sent to programmable component 128 by human operator 116. In particular, human operator 116 may view programming information 132 using programming unit 114 and enter programming information 132 into programmable component 128 directly.

As yet another example, human operator 114 may transfer programming information 132 from programming unit 114 to programmable component 128 using portable storage device 157. Portable storage device 157 may take the form of, for example, without limitation, a flash drive, a thumb drive, a memory card, or some other suitable type of portable storage device.

In this manner, programmable components 108 may be programmed based on locations 112 at which programmable components 108 belong. Programming of programmable components 108 may configure programmable components 108 to operate as desired.

For example, without limitation, programming of first programmable component 144 may configure first programmable component 144 to interact with second programmable component 146. In one illustrative example, first programmable component 144 may interact with second programmable component 146 by controlling second programmable component 146. In yet another example, first programmable component 144 may be programmed to be controlled by and/or receive commands from second programmable component 146. Further, first programmable component 144 may be programmed to recognize and perform operations based on information received from second programmable component 146.

In these illustrative examples, programmable components 108 may be installed prior to and/or after programming of programmable components 108. In one illustrative example, if programmable component 128 is not already installed at location 130 at the time of programming, programmable component 128 may be installed at location 130 after component manager 121 programs programmable component 128.

In some cases, programmable component 128 may already be installed at location 130 prior to programming of programmable component 128. For example, without limitation, human operator 116 may point programming unit 114 at programmable component 128 at location 130 to identify location 130.

However, programmable component 128 need not be visible to human operator 116 when human operator 116 is operating programming unit 114. For example, without limitation, programmable component 128 may be hidden by an object or structure in platform 104, such as a panel, a cover, or some other structure. In this example, location 130 at which programmable component 128 is pointed may be an approximate location of programmable component 128.

Programming unit 114 may identify programmable component 128 based on location 130, even though location 130 may not be an exact location of programmable component 128. Instead, location 130 may be an approximate location of programmable component 128.

As a result, number of points 152 in point cloud 138 that are associated with location 130 need not have substantially the same coordinates as location 130 with respect to object coordinate system 124. Rather, number of points 152 may be the number of points in point cloud 138 closest to location 130 within selected tolerances. In this manner, programming unit 114 may identify programmable component 128 even though programmable component 128 may not be clearly visible.

Further, programming unit 114 may obtain identifier information 158 from programmable component 128. Identifier information 158 may include any information that can be used to identify programmable component 128. For example, without limitation, identifier information 158 may include at least one of a media access code, a serial number, a part number, a processor serial number, a model number, an identification of a type of component, a code, and other suitable information.

Component manager 121 may store identifier information 158 obtained by programming unit 114 in database 134. As one illustrative example, component manager 121 may store identifier information 158 in component identifier 156. In some cases, component manager 121 may associate identifier information 158 for programmable component 128 with number of points 152 associated with location 130 at which programmable component 128 is installed.

In this manner, inventory 160 of programmable components 108 for platform 104 may be generated. Inventory 160 may be stored in database 134. Inventory 160 may be used for maintenance, upgrades, and other suitable purposes.

With programming unit 114 and component manager 121, programming of programmable components 108 may be performed without human operator 116 looking up and entering programming information, such as programming information 132. Instead, programming information 132 may be supplied to programming unit 114 based on an identification of programmable component 128.

Thereafter, programming unit 114 and/or human operator 116 may send programming information 132 to programmable component 128 to configure programmable component 128. In this manner, programming of programmable components 108 may be performed more quickly and/or with less errors as compared to currently available methods for configuring programmable components 108.

The illustration of component management environment 100 in FIG. 1 is not meant to imply physical or architectural limitations to the manner in which an illustrative embodiment may be implemented.

Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, first programmable component 144 may be configured to control a number of additional components in addition to second programmable component 146. In still other illustrative examples, at least a portion of database 134 may be located locally in programming unit 114 rather than on computer system 136. In another illustrative example, database 134 and point cloud 138 may be combined into a single model and/or database.

In different illustrative embodiments, platform 104 may take other forms other than aircraft 106. For example, without limitation, other illustrative embodiments may be applied to a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a bridge, a power plant, a dam, a manufacturing facility, a building, an airport, and/or some other suitable platform.

Figure 2:
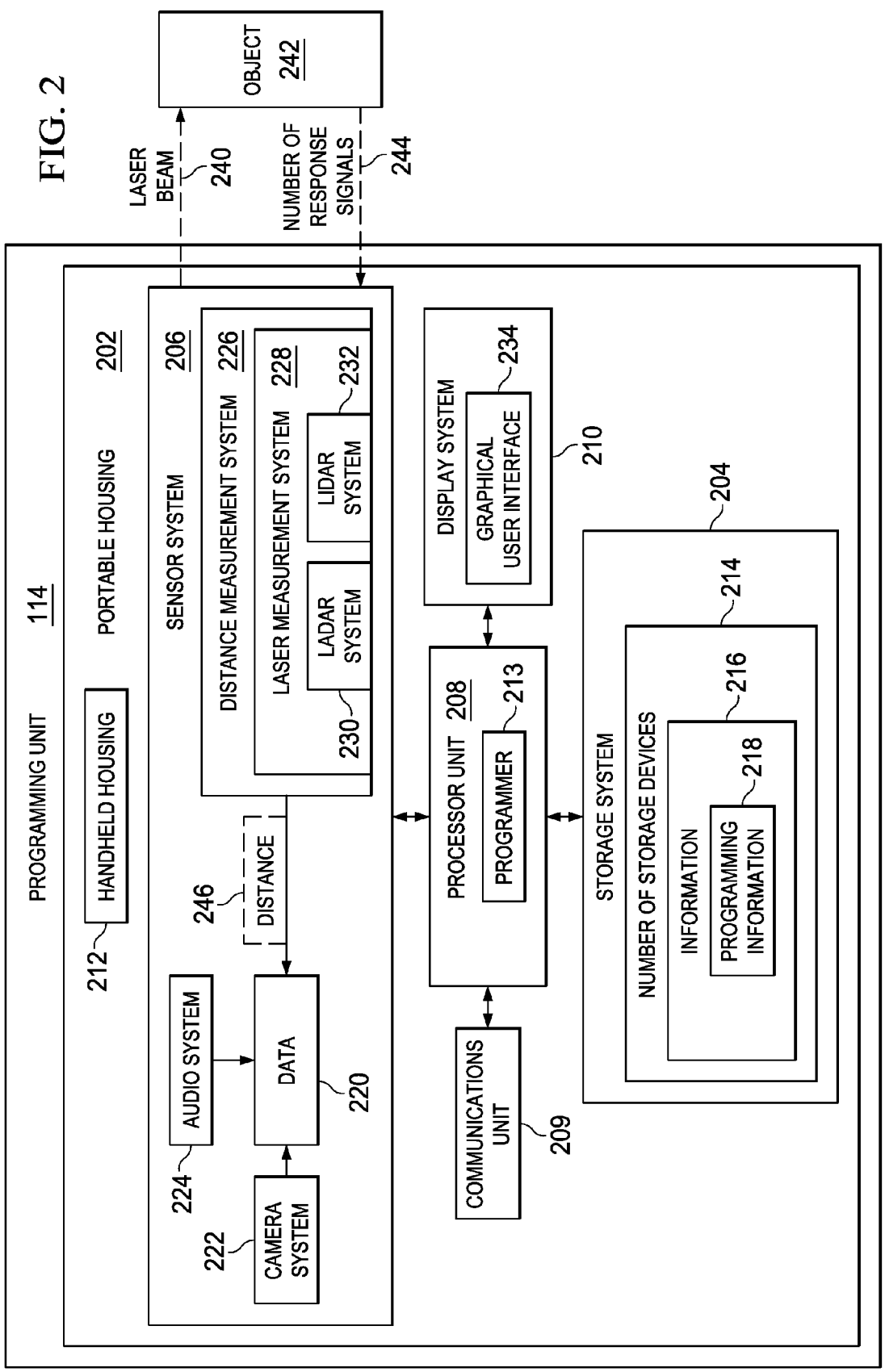
FIG. 2 is an illustration of a programming unit in accordance with an illustrative embodiment.

With reference now to FIG. 2, an illustration of a programming unit is depicted in accordance with an illustrative embodiment. As depicted, programming unit 114 may comprise portable housing 202, storage system 204, sensor system 206, processor unit 208, communications unit 209, and display system 210.

Portable housing 202 may be movable and, in particular, may be capable of being carried by, worn by, and/or otherwise moved around by a human operator, such as human operator 116 in FIG. 1, using programming unit 114. For example, portable housing 202 may be configured to be handheld housing 212 or some other suitable type of housing.

As depicted, storage system 204, sensor system 206, processor unit 208, and display system 210 may be associated with portable housing 202. When one component is "associated" with another component, the association may be a physical association in these depicted examples. For example, a first component, storage system 204, may be considered to be associated with a second component, portable housing 202, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Programmer 213 in processor unit 208 may be configured to control operation of programming unit 114. In this illustrative example, programmer 213 may be software run by processor unit 208 to control the operation of programming unit 114. In other examples, programmer 213 may be hardware in processor unit 208 or a combination of hardware and software.

Processor unit 208 may be implemented using a number of processors, a multi-processor core, or some other type of processor. Further, in some illustrative examples, processor unit 208 may be implemented using a hardware device that does not need software to run. For example, processor unit 208 may be a number of circuits configured to perform desired functions and/or processes. This number of circuits may include, for example, at least one of an integrated circuit, an application specific integrated circuit, a programmable array logic, a programmable logic array, a general logic array, a field programmable gate array, a programmable logic device, a complex programmable logic device, a programmable logic controller, a macrocell array, and other suitable types of circuits.

Storage system 204 may include number of storage devices 214. Number of storage devices 214 may be configured to store information 216. Information 216 may include at least one of, for example, without limitation, a model for an object, a point cloud for an object, a file, a report, an image, video data, audio data, sensor data, and other suitable types of information. In these illustrative examples, storage system 204 may store programming information 218.

As depicted, sensor system 206 may be configured to generate data 220. Camera system 222, audio system 224, distance measurement system 226, and/or laser measurement system 228 in sensor system 206 may generate data 220. Data 220 may include, for example, without limitation, images, video data, audio data, measurements, amplitudes of detected response signals, and other suitable types of data.

Camera system 222 may be configured to generate images and/or video data. Audio system 224 may be configured to detect sounds, such as, for example, without limitation, the voice of an operator.

Distance measurement system 226 may be configured to identify a distance between programming unit 114 and a component. Distance measurement system 226 may take the form of laser measurement system 228. Various systems may be used to implement laser measurement system 228. Laser measurement system 228 may include, for example, without limitation, laser detection and ranging (LADAR) system 230, light detection and ranging (LIDAR) system 232, or some other suitable type of system. In these illustrative examples, laser measurement system 228 may be configured to send laser beam 240 to object 242 and detect number of response signals 244 in response to laser beam 240. Number of response signals 244 may be used to identify distance 246 to object 242. Distance 246 may be part of data 220.

As depicted, sensor system 206 may be configured to send data 220 for storage in storage system 204 via processor unit 208. Processor unit 208 may be configured to identify a location of an object, such as object 242, using data 220 in these illustrative examples.

Display system 210 may be configured to display information on graphical user interface 234. This information may include data 220, information 216, and any other suitable type of information.

Communications unit 209 may be configured to provide communications with a computer system, such as computer system 136 in FIG. 1. In this illustrative example, communications unit 209 may be a wireless or wired communications unit. For example, communications unit 209 may be a wireless network adapter, a universal serial bus, a firewire connector, and/or other suitable types of communications hardware.

Further, programmer 213 in processor unit 208 may be configured to send programming information 218 to a component (not shown) to program that component over communications unit 209.

The illustration of components for programming unit 114 in FIG. 2 is not meant to imply physical or architectural limitations to the manner in which programming unit 114 may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative embodiments, a bus system may provide communication between storage system 204, sensor system 206, processor unit 208, and display system 210.

Figure 3:
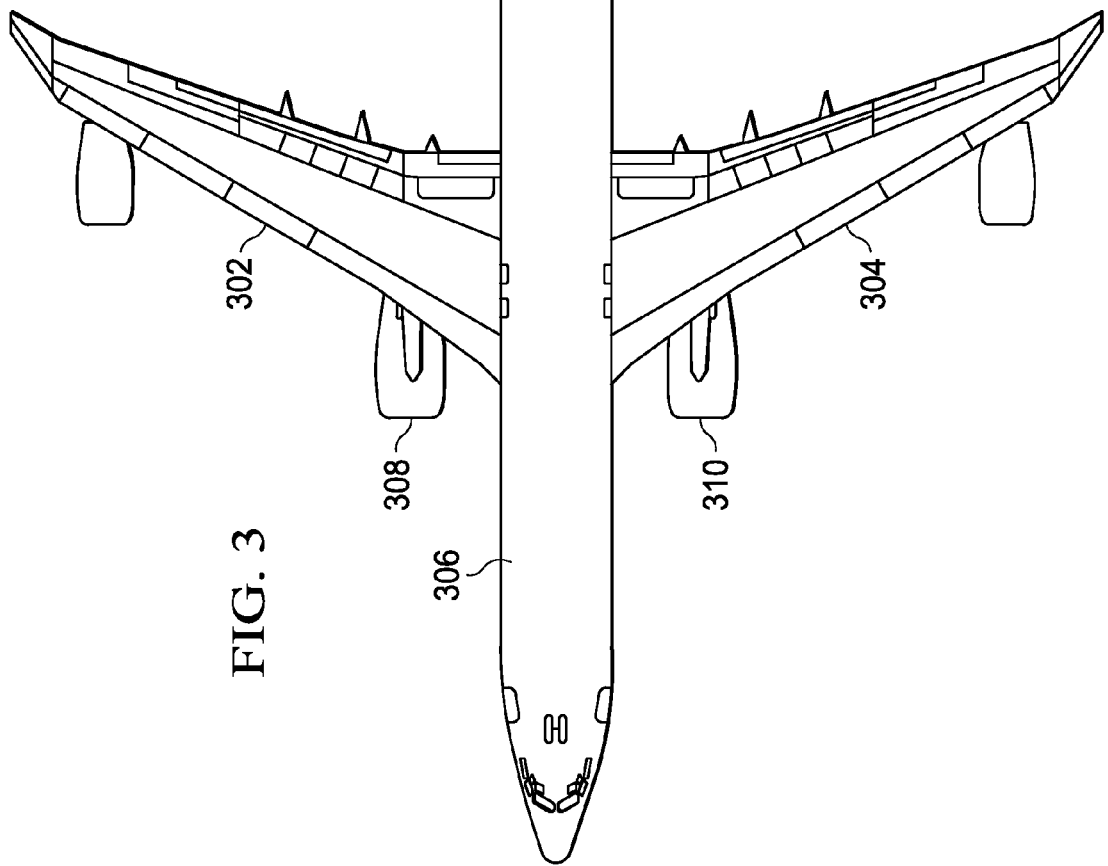
FIG. 3 is an illustration of an aircraft in accordance with an illustrative embodiment.

Turning now to FIG. 3, an illustration of an aircraft is depicted in accordance with an illustrative embodiment. In this illustrative example, aircraft 300 may be an example of an implementation for aircraft 106 in FIG. 1.

In this illustrative example, aircraft 300 may have wing 302 and wing 304 attached to fuselage 306. Further, aircraft 300 also may have engine 308 attached to wing 302 and engine 310 attached to wing 304. Tail 312 of aircraft 300 may have horizontal stabilizer 314, horizontal stabilizer 316, and vertical stabilizer 318.

Figure 4:
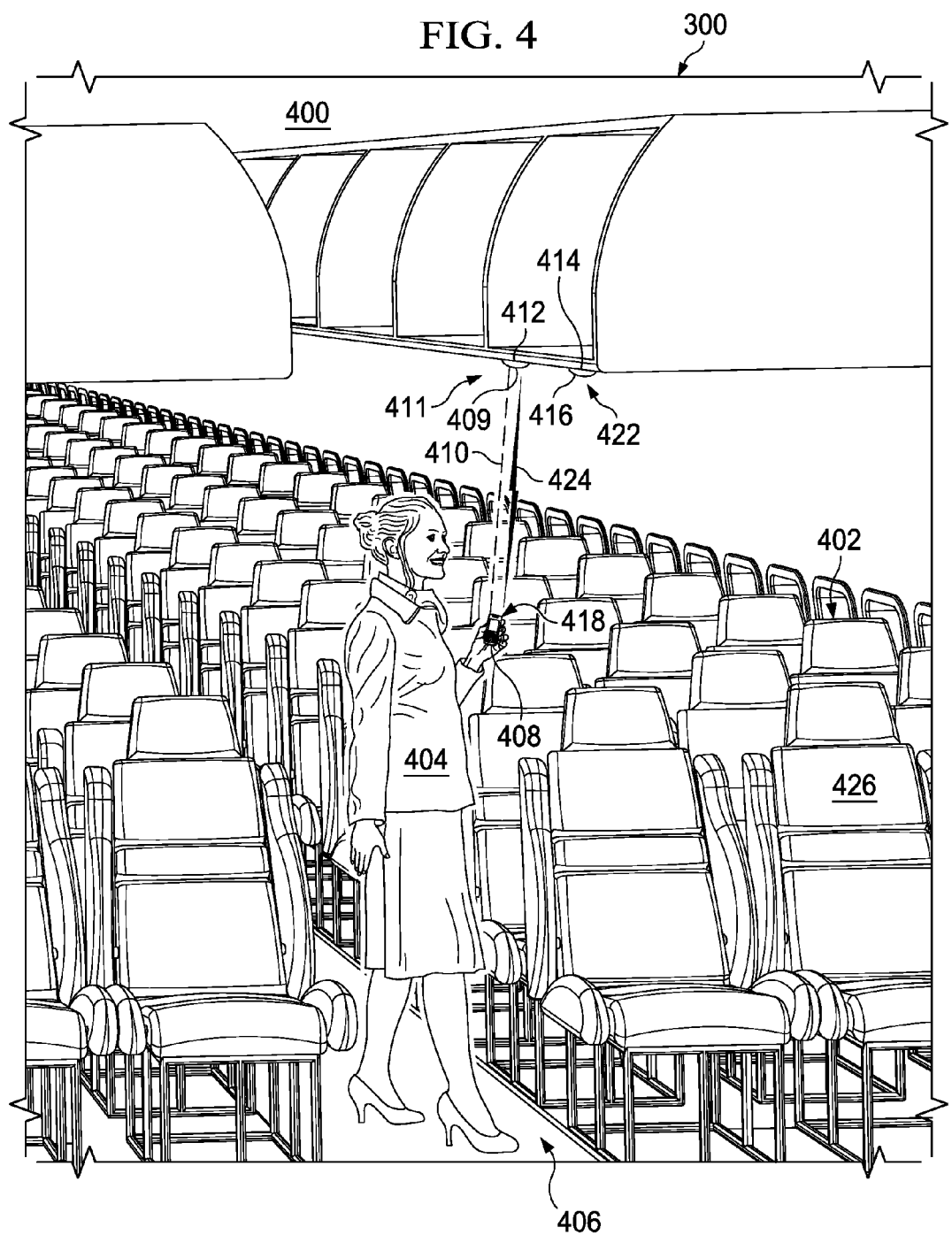
FIG. 4 is an illustration of a cabin in an aircraft in accordance with an illustrative embodiment.

With reference now to FIG. 4, an illustration of a cabin in an aircraft is depicted in accordance with an illustrative embodiment. In this illustrative example, cabin 400 may be located in aircraft 300 in FIG. 3.

As depicted, cabin 400 of aircraft 300 may have seats 402. In this illustrative example, operator 404 may be located in aisle 406 of cabin 400. As depicted, operator 404 may have programming unit 408. Programming unit 408 may be implemented using programming unit 114 in FIG. 1. Operator 404 may point programming unit 408 at component 409 located over seat 426. While pointed at component 409, programming unit 408 may emit laser beam 410 at component 409. Laser beam 410 may be used to identify location 411 of component 409.

In this illustrative example, component 409 may take the form of light switch 412. Programming unit 408 may be configured to program light switch 412 to operate component 414, which may take the form of light 416. This component may be also located over seat 426. This programming may be performed without connecting wires between light switch 412 and light 416.

In this illustrative example, programming unit 408 identifies position 418 in aircraft 300. Position 418 is the position of programming unit 408 in these illustrative examples.

Based on position 418 of programming unit 408, location 411 of light switch 412 may be identified. In a similar fashion, location 422 of light 416 also may be identified when programming unit 408 may be pointed at light 416.

Thereafter, programming unit 408 may receive programming information for light switch 412 and light 416. Programming unit 408 may then transmit the programming information over wireless communications link 424 to light switch 412 and light 416 in these illustrative examples. In this manner, programming unit 408 may configure light switch 412 and light 416 to interact with each other.

Figure 5:
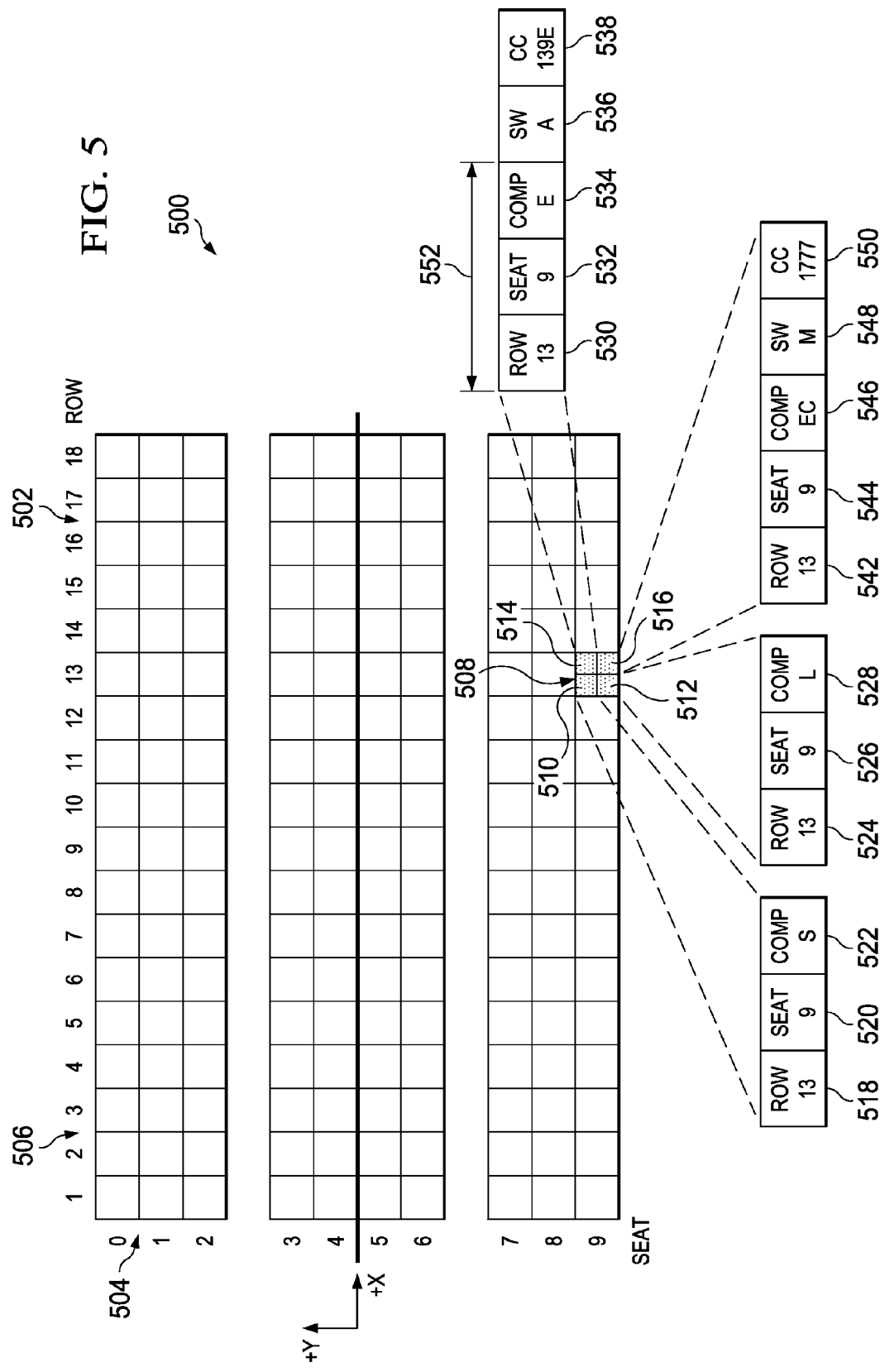
FIG. 5 is an illustration of passenger seating in a cabin in accordance with an illustrative embodiment.

Turning now to FIG. 5, an illustration of passenger seating in a cabin is depicted in accordance with an illustrative embodiment. In this illustrative example, passenger seating design 500 may be an example of a passenger seating design for seats 402 in cabin 400 in FIG. 4.

As depicted, seats 502 may be arranged by columns 504 and rows 506. Each seat in passenger seating design 500 may be associated with components. For example, seat 508 in passenger seating design 500 may be an example of seat 426 in FIG. 4. In this illustrative example, seat 508 may have light switch programming information 510, light programming information 512, in-flight entertainment unit programming information 514, and entertainment controller programming information 516. This programming information for seat 508 may be used to program components for seat 426 in cabin 400.

For example, light switch programming information 510 in passenger seating design 500 may be used to program light switch 412 in cabin 400 in FIG. 4. Light programming information 512 in passenger seating design 500 may be used to program light 416 in cabin 400 in FIG. 4.

In this illustrative example, passenger seating design 500 may be used to identify programming information for light switch 412 in FIG. 4. If the location information identifies light switch programming information 510 for seat 508 in passenger seating design 500 for light switch 412, light switch programming information 510 may be used to program light switch 412.

For example, light switch programming information 510 may comprise row 518, seat 520, and component type 522. In this illustrative example, row 518 may be 13, seat 520 may be nine, and component type may be S. This programming information may be used by light switch 412 to identify itself to light 416. Light switch programming information 510 may be sent to light switch 412 to allow light switch 412 to identify itself to light 416.

In a similar fashion, light programming information 512 may be identified for light 416 in cabin 400 in FIG. 4. In this illustrative example, light programming information 512 may include row 524, seat 526, and component type 528. Row 524 may be 13, seat 526 may be nine, and component type 528 may be L.

In other illustrative examples, more-detailed programming information also may be present. For example, in-flight entertainment unit programming information 514 may include row 530, seat 532, component type 534, programming software 536, and control code 538. In this example, row 530 may be 13, seat 532 may be nine, and component type 534 may be E. Programming software 536 may identify the type of software on the component. In this illustrative example, programming software 536 may be manufacturer A, and control code 538 may be 139E.

As another example, entertainment controller programming information 516 may include row 542, seat 544, component type 546, programming software 548, and control code 550. As depicted, row 542 may be 13, seat 544 may be nine, and component type 546 may be EC. Programming software 548 may be M, and control code 550 may be 1777.

In these illustrative examples, row 530, seat 532, and component type 534 may form identifier 552. Identifier 552 may be used by a component to uniquely identify itself to other components. Programming software 536 may identify the type of software running on the component. This software type may be used to identify the manner in which a programming unit communicates with the component. Programming software 536 may be used to perform operations to program the component. Control code 538 may be used to select functions in the component.

The illustration of components and programming information in FIGS. 4 and 5 are not meant to imply physical or architectural limitations to the manner in which an illustrative embodiment may be implemented. For example, other types of components may be programmed other than those depicted. Examples may include, without limitation, a sensor, a navigation system, a tool, an oxygen generator, and other suitable components. The programming information may be identified differently from the example in FIG. 5. For example, programming information may be associated with coordinates in the aircraft rather than seats as illustrated in FIG. 5. In other words, a database of coordinates may be present in which each coordinate corresponds to a component and includes an identification of information for that component.

Figure 6:
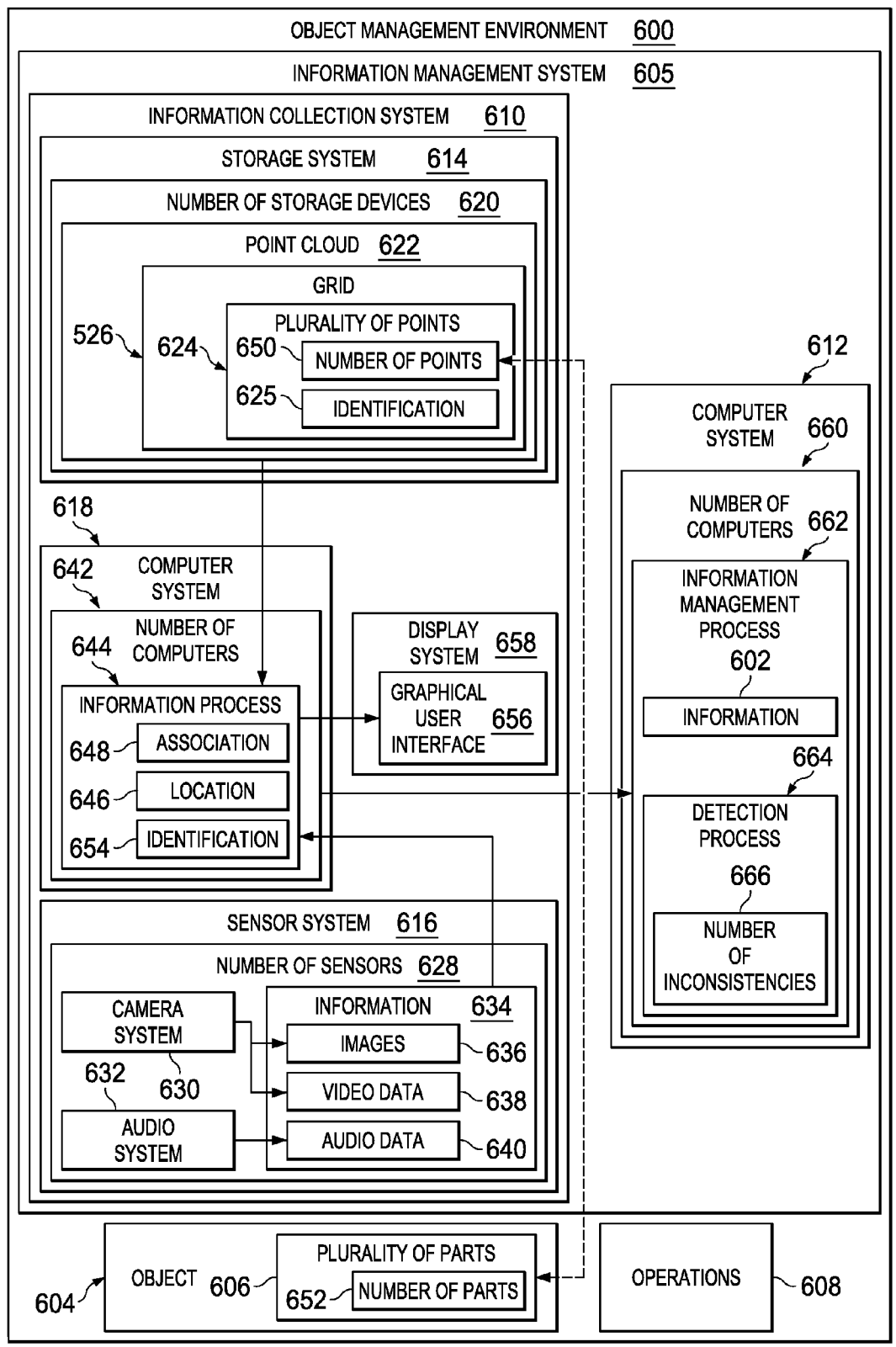
FIG. 6 is an illustration of an object management environment in accordance with an illustrative embodiment.

With reference now to FIG. 6, an illustration of an object management environment is depicted in accordance with an illustrative embodiment. Object management environment 600 may be an environment in which object 604 and information 602 for object 604 may be managed.

In these illustrative examples, object 604 may be a physical object. Object 604 may be, for example, a structure in aircraft 300 in FIG. 3. In other illustrative examples, object 604 may take the form of aircraft 300 in FIG. 3. In some cases, object 604 may take the form of object 133 or platform 104 in FIG. 1.

As depicted, object 604 may include parts 606 that may be assembled together to form object 604. Operations 608 may be performed for object 604 by an operator in object management environment 600 to manage object 604. Operations 608 may include, for example, without limitation, assembling parts 606, reworking a part in parts 606, adding a part to parts 606 in object 604, replacing a part in parts 606, collecting information about the state of object 604, performing an inspection of object 604, performing maintenance of parts 606 for object 604, and/or other suitable types of operations.

In these illustrative examples, performing an operation in operations 608 may require identifying information 602 about object 604. Information 602 may include, for example, data about object 604, a file, a report, a log, an identification of inconsistencies in object 604, a policy identifying design specifications for object 604, a model for object 604, and/or other suitable types of information.

Information 602 may be managed using information management system 605. Information management system 605 may include information collection system 610 and computer system 612. Computer system 612 may be in a location remote to information collection system 610 in these examples. Additionally, information collection system 610 and computer system 612 may be in communication with each other in these illustrative examples. For example, information collection system 610 and computer system 612 may exchange information using a wireless and/or wired communications link.

In these depicted examples, an operator may use information collection system 610 to collect information about object 604 when parts 606 for object 604 are not yet assembled, partially assembled, and/or fully assembled together. Information collection system 610 may include storage system 614, sensor system 616, and computer system 618. Storage system 614 and sensor system 616 may be in communication with computer system 618.

As illustrated, storage system 614 may include number of storage devices 620. Number of storage devices 620 may be configured to store information 602 about object 604. For example, number of storage devices 620 may be configured to store point cloud 622 for object 604. Point cloud 622 may be a three-dimensional grid that may be uniformly spaced in these examples. Each of plurality of points 624 in point cloud 622 may be associated with data about object 604. This data may include, for example, identification 625 of a part in parts 606 for object 604.

Sensor system 616 may include number of sensors 628. Number of sensors 628 may include at least one of camera system 630, audio system 632, and other suitable types of sensors. Number of sensors 628 may be configured to generate information 634. Information 634 may comprise, for example, at least one of images 636 generated by camera system 630, video data 638 generated by camera system 630, audio data 640 generated by audio system 632, and other suitable types of information. Number of sensors 628 may be configured to send information 634 to computer system 618.

Computer system 618 may include number of computers 642 in this illustrative example. Information process 644 may run on number of computers 642. Information process 644 may use information 634 to identify location 646 on object 604. For example, location 646 may use a number of images in images 636 and/or video data 638 to identify location 646.

Location 646 may be a location identified using a coordinate system. For example, location 646 may be identified using a Cartesian coordinate system. Of course, in other illustrative examples, other coordinate systems, such as a polar coordinate system, may be used.

Information process 644 may identify association 648 between location 646 and number of points 650 in point cloud 622 for object 604. For example, information process 644 may compare location 646 to plurality of points 624 in point cloud 622. Information process 644 may identify number of points 650 in plurality of points 624 that may be associated with location 646 to form association 648. Number of points 650 may be associated with location 646 by being in a same relative location in point cloud 622 for object 604 as location 646 on object 604.

In this depicted example, number of points 650 may be associated with number of parts 652 in parts 606. For example, each of number of points 650 may be associated with an identification of a part in number of parts 652. Information process 644 may associate location 646 with number of parts 652 based on association 648 between location 646 and number of points 650. Number of parts 652 may include, for example, without limitation, a programmable component in programmable components 108.

Information process 644 may present identification 654 of number of parts 652 for object 604 associated with location 646 on graphical user interface 656 on display system 658. Display system 658 may be part of information collection system 610 in these examples.

In response to a presentation of identification 654 on graphical user interface 656, an operator may decide to use sensor system 616 to generate additional information in information 634. For example, an operator may use sensor system 616 to generate additional video data for object 604. As another example, the operator may decide to create an audio recording describing the appearance of number of parts 652 associated with location 646.

The additional information in information 634 generated by sensor system 616 may be sent to information process 644. Information process 644 may associate information 634 with location 646 on object 604. In some illustrative examples, information 634 may be presented on graphical user interface 656 on display system 658.

In these illustrative examples, location 646 on object 604, identification 654 of number of parts 652, and/or information 634 may be sent to computer system 612 for further processing. Computer system 612 may be comprised of number of computers 660.

Information management process 662 may run on number of computers 660. Information management process 662 may be any process configured to use location 646 on object 604, identification 654 of number of parts 652, and/or information 634 to generate and/or manage information 602 about object 604. For example, information 634 generated by sensor system 616 may be used by information management process 662 to generate a report about object 604.

As one illustrative example, detection process 664 in information management process 662 may be configured to use location 646 on object 604, identification 654 of number of parts 652, and/or information 634 to identify number of inconsistencies 666 in object 604. An inconsistency, in these examples, may also be referred to as a nonconformance.

In these depicted examples, the identification of number of inconsistencies 666 may be used in performing operations 608. In one illustrative example, operations 608 may include inspecting object 604 for inconsistencies. The identification of number of inconsistencies 666 may be used to make determinations that additional operations are to be performed. For example, number of inconsistencies 666 may require rework or replacement of a part.

In some illustrative examples, operations 608 may include assembling a number of parts together for object 604 and installing fasteners to assemble the number of parts together. Information 602 generated by information management process 662 may be used to identify the type and/or size of fasteners needed for assembling the parts together. In other illustrative examples, operations 608 may include programmable components 108 as illustrated in FIG. 1.

The illustration of object management environment 600 in FIG. 6 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, a first portion of number of computers 642 in computer system 618 may be in a location remote to a second portion of number of computers 642. Further, in some illustrative examples, information management process 662 with detection process 664 may be configured to run on number of computers 642. In this manner, computer system 612 may not be needed.

In other illustrative examples, object 604 may be a structure for a platform other than an aircraft. For example, object 604 may be a structure in a platform selected from one of a mobile platform, a stationary platform, a land-based structure, an aquatic-based structure, a space-based structure, and/or some other suitable object. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a bridge, a manufacturing facility, a building, and/or some other suitable object.

Figure 7:
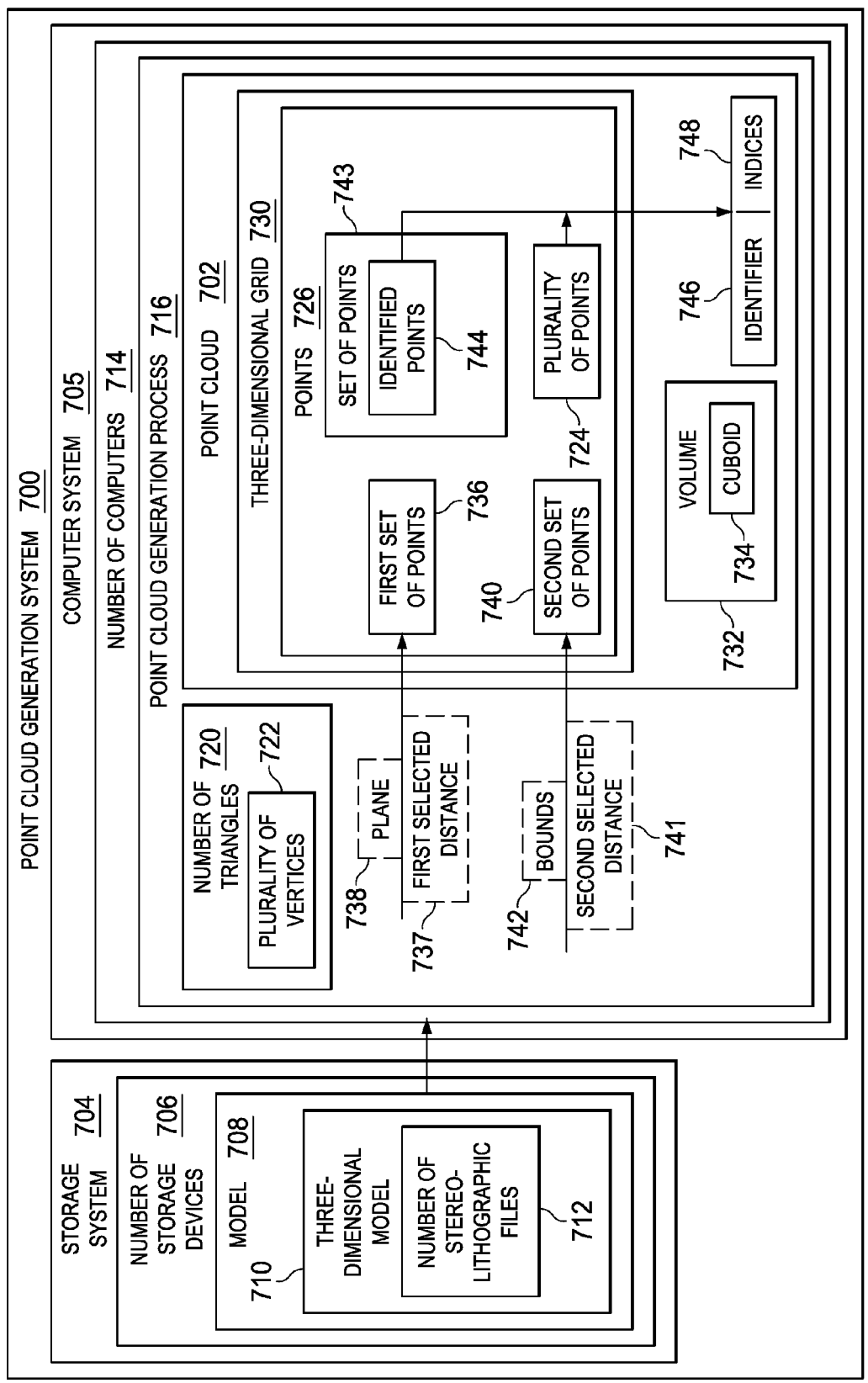
FIG. 7 is an illustration of a point cloud generation system in accordance with an illustrative embodiment.

With reference now to FIG. 7, an illustration of a point cloud generation system is depicted in accordance with an illustrative embodiment. In this illustrative example, point cloud generation system 700 may be configured to generate data for point cloud 702. Point cloud 702 may be an example of one implementation for point cloud 138 in FIG. 1 and point cloud 622 in FIG. 6.

In this illustrative example, point cloud generation system 700 may include storage system 704 and computer system 705. Storage system 704 may comprise number of storage devices 706. Some, all, or none of number of storage devices 706 may be part of a storage system for an information collection system, such as storage system 614 for information collection system 610 in FIG. 6.

Number of storage devices 706 may be configured to store model 708. Model 708 may be a model for an object, such as platform 104 in FIG. 1 or object 604 in FIG. 6. Model 708 may be three-dimensional model 710 in these examples. More specifically, three-dimensional model 710 may comprise number of stereolithographic files 712. Each of number of stereolithographic files 712 may be for a part in the object for which model 708 was generated.

In this depicted example, computer system 705 may comprise number of computers 714. Some, all, or none of number of computers 714 may be part of a computer system in an information management system, such as information management system 605 in FIG. 6. For example, some, all, or none of number of computers 714 may be part of computer system 612 or computer system 618 in FIG. 6.

Point cloud generation process 716 may run on number of computers 714 in these examples. Point cloud generation process 716 may be configured to retrieve number of stereolithographic files 712 from storage system 704. Point cloud generation process 716 may identify number of triangles 720 for a part identified in each stereolithographic file in number of stereolithographic files 712. In particular, point cloud generation process 716 may identify plurality of vertices 722 for each triangle in number of triangles 720. Plurality of vertices 722 may include three vertices for each triangle.

As illustrated, point cloud generation process 716 may assign plurality of vertices 722 to plurality of points 724 from points 726 in point cloud 702. Points 726 may be on three-dimensional grid 730. Further, points 726 may be uniformly spaced on three-dimensional grid 730. As one illustrative example, point cloud generation process 716 may assign plurality of vertices 722 to plurality of points 724 by assigning each vertex in plurality of vertices 722 to a nearest point in point cloud 702.

Point cloud generation process 716 may identify volume 732 within point cloud 702. Volume 732 may be cuboid 734 in these examples. Cuboid 734 may encompass plurality of vertices 722. In other words, each of plurality of vertices 722 may be located within cuboid 734 in three-dimensional grid 730 for point cloud 702.

First set of points 736 in point cloud 702 may be identified by point cloud generation process 716. First set of points 736 may include the points in points 726 in point cloud 702 that may be within cuboid 734 and within first selected distance 737 from plane 738 defined by plurality of vertices 722. First selected distance 737 may be, for example, without limitation, one grid unit spacing in three-dimensional grid 730 from plane 738.

Second set of points 740 in point cloud 702 may be identified by point cloud generation process 716. Second set of points 740 may include the points in points 726 in point cloud 702 that may be within second selected distance 741 from bounds 742 defined by plurality of vertices 722. Bounds 742 may be the edges of the triangle formed by plurality of vertices 722. Second selected distance 741 may be outside of bounds 742 or within bounds 742.

Point cloud generation process 716 may identify set of points 743 at the intersection of first set of points 736 and second set of points 740. Set of points 743 may form identified points 744 in point cloud 702. Point cloud generation process 716 may assign identifier 746 to identified points 744 and plurality of points 724 in point cloud 702.

Identifier 746 may be, for example, a part number for the part for which the particular stereolithographic file was generated. Point cloud generation process 716 may store indices 748 in identified points 744 and plurality of points 724 in point cloud 702. Indices 748 may be referenced to identifier 746. In this manner, identifier 746 may be assigned to identified points 744 and plurality of points 724 in point cloud 702.

In this manner, point cloud generation process 716 may generate data for point cloud 702 for an object. The data may include the identifiers for the different parts in the object and/or other suitable information.

In this illustrative example, point cloud 702 and the data generated for point cloud 702 may be stored in storage system 704. Further, point cloud 702 and the data generated for point cloud 702 may be sent to programming unit 114 in FIG. 1 and/or information collection system 610 in FIG. 6.

Figure 8:
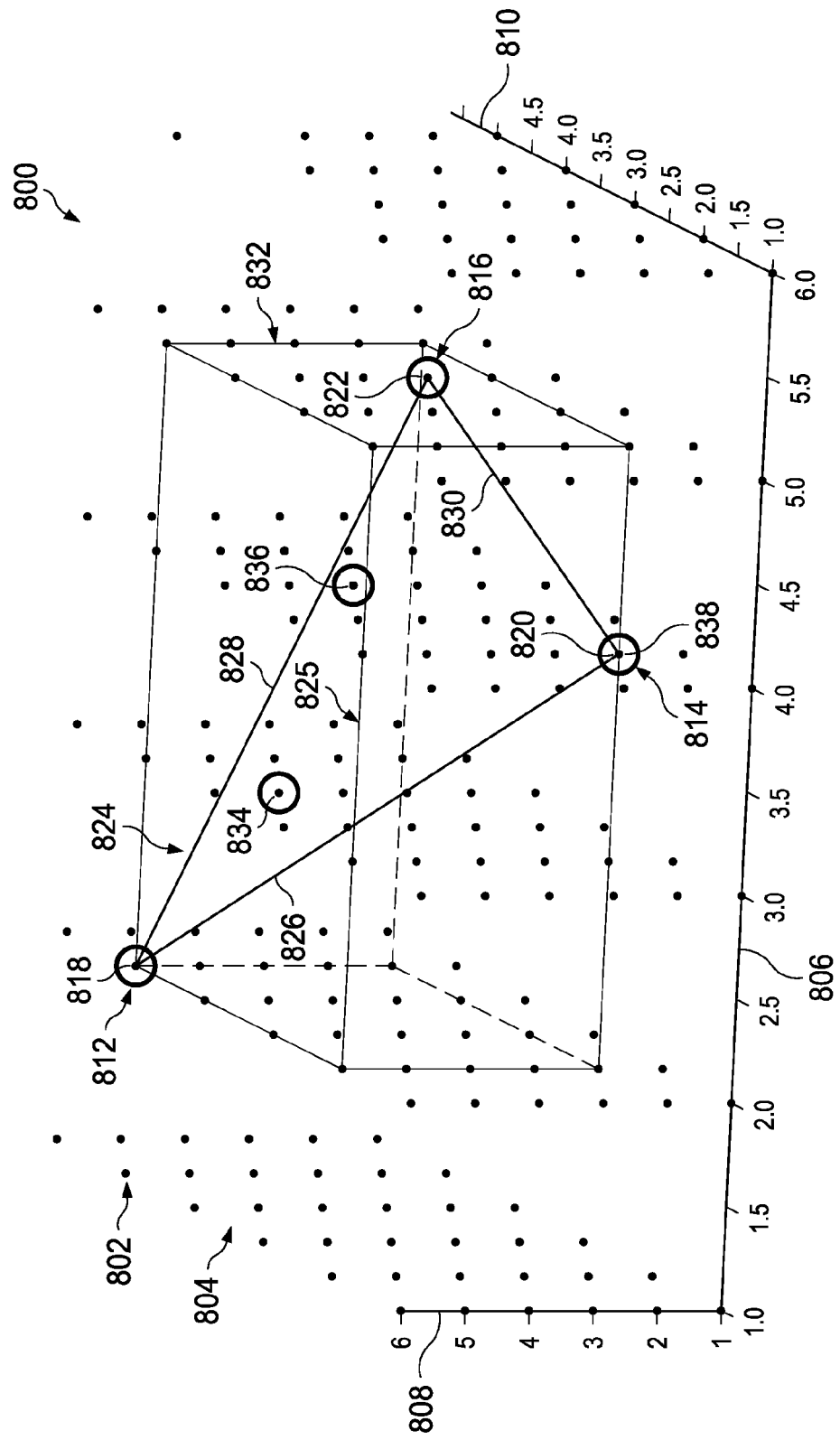
FIG. 8 is an illustration of a point cloud in accordance with an illustrative embodiment.

With reference now to FIG. 8, an illustration of a point cloud is depicted in accordance with an illustrative embodiment. In this illustrative example, point cloud 800 may be an example of point cloud 138 in FIG. 1, point cloud 622 in FIG. 6, and/or point cloud 702 in FIG. 7. Point cloud 800 may have points 802.

As illustrated, points 802 may be on three-dimensional grid 804. Three-dimensional grid 804 may have first axis 806, second axis 808, and third axis 810. Points 802 may have uniformly spaced on three-dimensional grid 804. In other words, each grid unit in three-dimensional grid 804 may have substantially the same size.

In this illustrative example, vertices 812, 814, and 816 may have been assigned to points 818, 820, and 822, respectively. Vertices 812, 814, and 816 form triangle 824 with bounds 826, 828, and 830. Further, plane 825 is defined by vertices 812, 814, and 816.

As depicted, vertices 812, 814, and 816 may be encompassed within cuboid 832. Cuboid 832 may be an example of one implementation for volume 732 in FIG. 7. Using cuboid 832, plane 825, and bounds 826, 828, and 830, a point cloud generation system may identify a set of points in points 802 within cuboid 832, within a first selected distance from plane 825, and within a second selected distance from bounds 826, 828, and 830.

In this illustrative example, the set of points may include points 834, 836, and 838. Each of these points and points 818, 820, and 822 may be associated with an identifier for a part. For example, an index may be stored for each point in which the index is referenced to a part number for a part. The part may be the part for which the stereolithographic file identifying triangle 824 was created.

Figure 9:
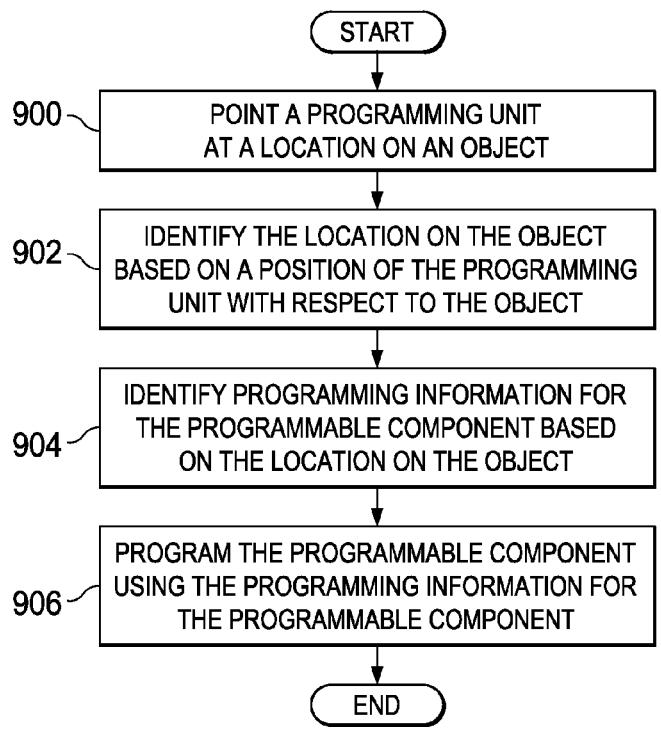
FIG. 9 is an illustration of a flowchart of a process for managing a programmable component in accordance with an illustrative embodiment.

With reference now to FIG. 9, an illustration of a flowchart of a process for managing a programmable component is depicted in accordance with an illustrative embodiment. The process illustrated in FIG. 9 may be implemented in component management environment 100 in FIG. 1. In particular, the process may be implemented using programming unit 114 and component manager 121 in FIG. 1.

The process may begin by pointing programming unit 114 at location 130 on object 133 (operation 900). Object 133 may be an object in platform 104. In some illustrative examples, programmable component 128 may be installed at location 130. In other illustrative examples, programmable component 128 may not be installed at location 130 prior to programming.

The process may then identify location 130 on object 133 based on position 118 of programming unit 114 with respect to object 133 (operation 902). Location 130 may be identified with respect to object coordinate system 124.

Thereafter, the process may identify programming information 132 for programmable component 128 based on location 130 on object 133 (operation 904). Programming information 132 may comprise, for example, without limitation, at least one of an identifier, a control code, a program, a configuration file, and/or other suitable types of information.

The process may then program programmable component 128 using programming information 132 for programmable component 128 (operation 906), with the process terminating thereafter.

Operation 906 may be performed in a number of different ways. For example, operation 906 may involve programming unit 114 sending programming information 132 to programmable component 128 over communications link 142 with programmable component 128. In other illustrative examples, programming information 132 may be sent to programmable component 128 by human operator 116. In some cases, human operator 116 may enter programming information 132 into programmable component 128 or may transfer programming information 132 to programmable component 128 using portable storage device 157.

Figure 10:
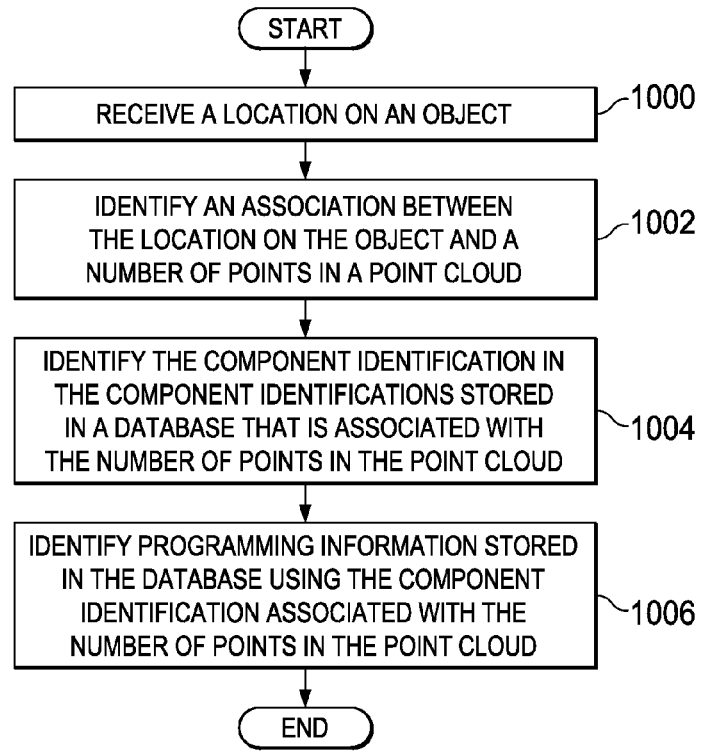
FIG. 10 is an illustration of a flowchart of a process for identifying programming information for a programmable component in accordance with an illustrative embodiment.

Turning now to FIG. 10, an illustration of a flowchart of a process for identifying programming information for a programmable component is depicted in accordance with an illustrative embodiment. The process illustrated in FIG. 10 may be implemented in component manager 121 in FIG. 1.

The process may begin by receiving location 130 on object 133 (operation 1000). The process may then identify an association between location 130 on object 133 and number of points 152 in point cloud 138 (operation 1002).

Thereafter, the process may identify the component identification in component identifications 139 stored in database 134 that is associated with number of points 152 in point cloud 138 (operation 1004). Next, the process may identify programming information 132 stored in database 134 using the component identification associated with number of points 152 in point cloud 138 (operation 1004), with the process terminating thereafter.

Figure 11:
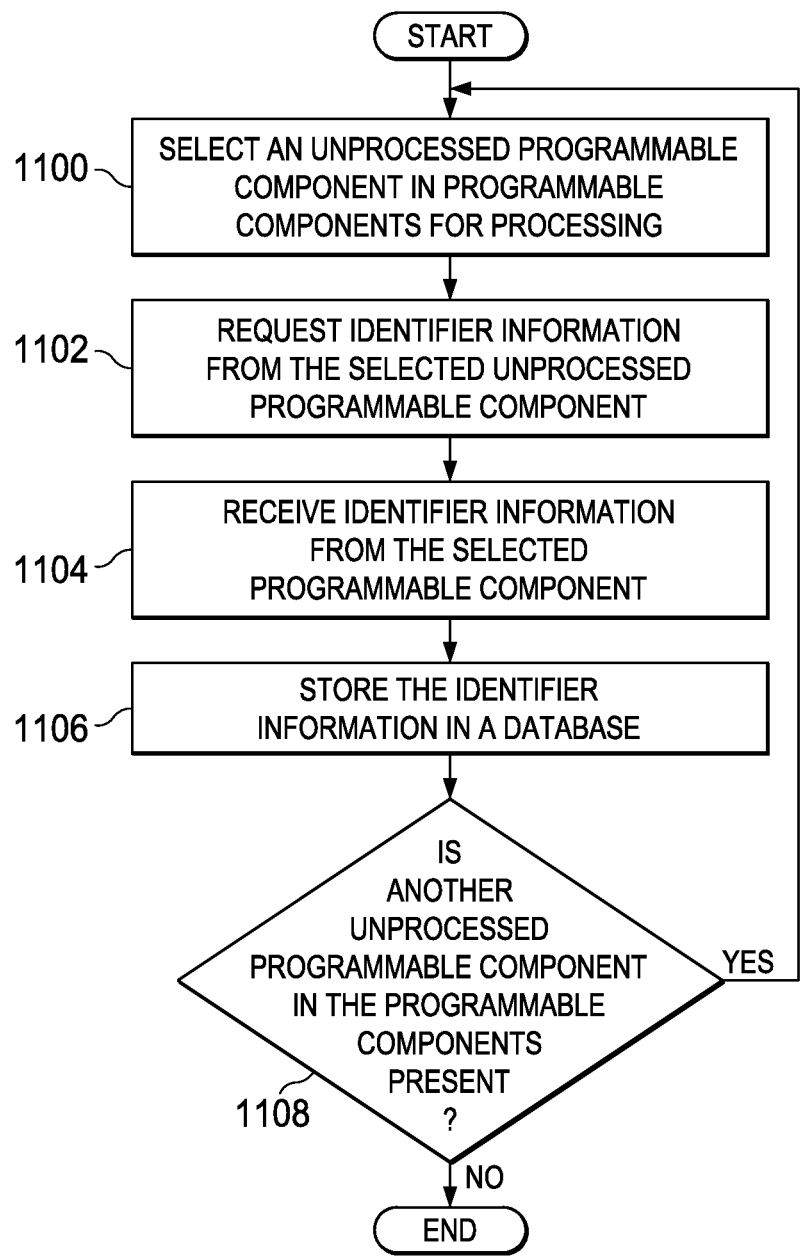
FIG. 11 is an illustration of a flowchart for processing identifier information in accordance with an illustrative embodiment.

With reference now to FIG. 11, an illustration of a flowchart for processing identifier information is depicted in accordance with an illustrative embodiment. The process illustrated in FIG. 11 may be implemented in component management environment 100 in FIG. 1 and programming unit 114 in FIG. 2. In particular, this process may be implemented using at least one of programmer 213 in programming unit 114 in FIG. 2 and component manager 121 in computer system 136 in FIG. 1.

The process may begin by selecting an unprocessed programmable component in programmable components 108 for processing (operation 1100). The process may then request identifier information from the selected unprocessed programmable component (operation 1102). Next, the identifier information may be received from the selected programmable component (operation 1104). The identifier information may then be stored in database 134 (operation 1106).

A determination may be made as to whether another unprocessed programmable component in programmable components 108 may be present (operation 1108). If another unprocessed programmable component is present, the process may return to operation 1100. Otherwise, the process may terminate.

In this manner, inventory 160 may be generated for programmable components 108 in platform 104. Inventory 160 may then be used to perform inspections, maintenance, upgrades, and other suitable operations for platform 104.

Figure 12:
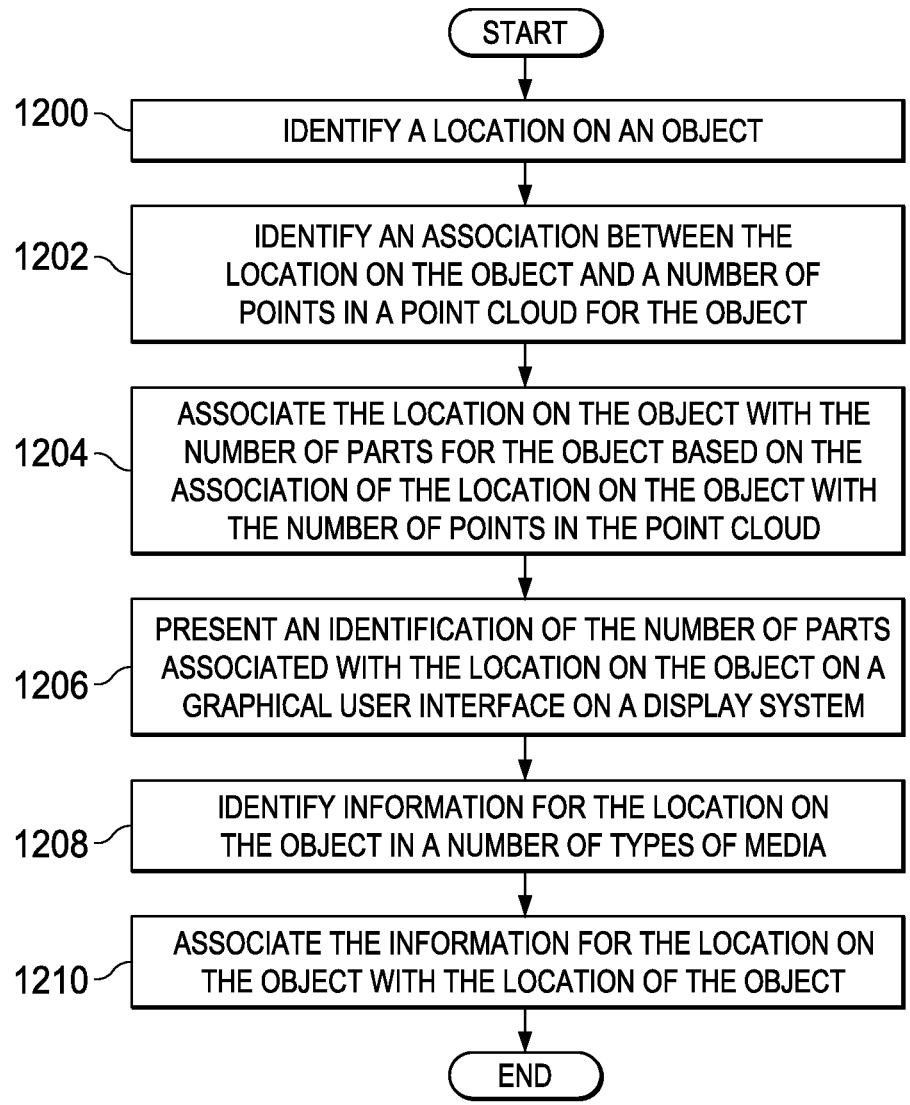
FIG. 12 is an illustration of a flowchart of a process for managing information about an object in accordance with an illustrative embodiment.

With reference now to FIG. 12, an illustration of a flowchart of a process for managing information about an object is depicted in accordance with an illustrative embodiment. The process illustrated in FIG. 12 may be implemented using, for example, information management system 605 in FIG. 6. In particular, this process may be implemented using information process 644 in FIG. 6.

The process may begin by identifying location 646 on an object 604 (operation 1200). This location may be identified using data obtained from sensor system 616. Further, this location may be identified using a coordinate system, such as a Cartesian coordinate system.

The process may identify association 648 between location 646 the object 604 and number of points 650 in point cloud 622 for object 604 (operation 1202). Number of points 650 in point cloud 622 may be associated with number of parts 652 for object 604. In this illustrative example, more than one point may be associated with a same part.

Next, the process may associate location 646 on object 604 with number of parts 652 for object 604 based on association 648 of location 646 on object 604 with number of points 650 in point cloud 622 (operation 1204). Thereafter, the process may present an identification of number of parts 652 associated with location 646 on object 604 on graphical user interface 656 on display system 658 (operation 1206). In this manner, the operators may be able to view number of parts 652 identified as associated with location 646.

The process may then identify information 634 for location 646 on object 604 in a number of types of media (operation 1208). Operation 1208 may be performed by receiving information generated by a sensor system in the number of types of media. For example, the information may include at least one of images, video data, and audio data.

The process may associate information 634 for location 646 on object 604 with location 646 on object 604 (operation 1210), with the process terminating thereafter.

Figure 13:
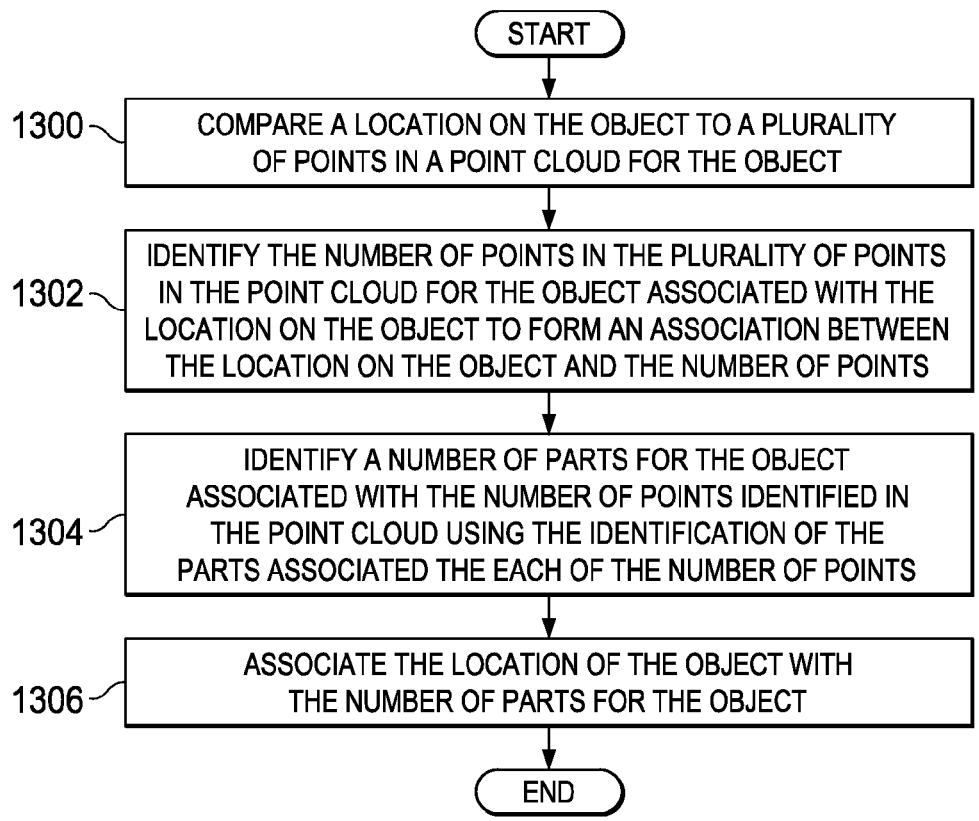
FIG. 13 is an illustration of a flowchart of a process for associating a location with a number of parts in accordance with an illustrative embodiment.

With reference now to FIG. 13, an illustration of a flowchart of a process for associating a location with a number of parts is depicted in accordance with an illustrative embodiment. The process illustrated in FIG. 13 may be a more detailed process of operation 1202 and operation 1204 in FIG. 12. This process may be implemented using information management system 605 in FIG. 6. In particular, the process illustrated in FIG. 13 may be implemented using information process 644 in FIG. 6.

The process may begin by comparing location 646 on object 604 to plurality of points 624 in point cloud 622 for object 604 (operation 1300). In operation 1300, location 646 may be location 646 identified in operation 1200 in FIG. 12. Each of plurality of points 624 in point cloud 622 may be associated with identification 654 of a part for object 604.

Thereafter, the process may identify number of points 650 in plurality of points 624 in point cloud 622 for object 604 associated with location 646 on object 604 to form association 648 between location 646 on object 604 and number of points 650 (operation 1302). Next, the process may identify number of parts 652 for object 604 associated with number of points 650 identified in point cloud 622 using identification 654 of the part associated with each of number of points 650 (operation 1304).

The process may then associate location 646 on object 604 with number of parts 652 for object 604 (operation 1306), with the process terminating thereafter.

Figure 14:
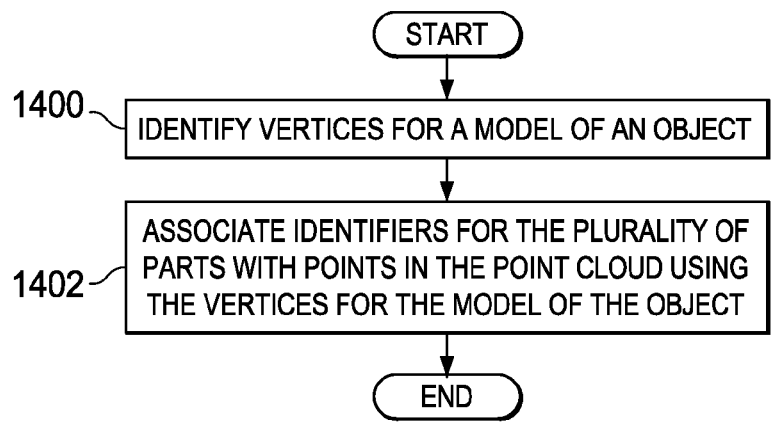
FIG. 14 is an illustration of a flowchart of a process for generating data for a point cloud in accordance with an illustrative embodiment.

With reference now to FIG. 14, an illustration of a flowchart of a process for generating data for a point cloud is depicted in accordance with an illustrative embodiment. The process illustrated in FIG. 14 may be implemented using point cloud generation system 700 in FIG. 7. In particular, this process may be implemented using point cloud generation process 716 in FIG. 7.

The process may begin by identifying plurality of vertices 772 for model 708 of object 604 (operation 1400). Object 604 may be comprised of plurality of parts 606. For example, object 604 may be formed when plurality of parts 606 is assembled together. In operation 1400, model 708 for object 604 may be three-dimensional model 710.

Thereafter, the process may associate identifiers for plurality of parts 606 with points 726 in point cloud 702 using plurality of vertices 722 for model 708 of object 604 (operation 1402), with the process terminating thereafter.

Figure 15:
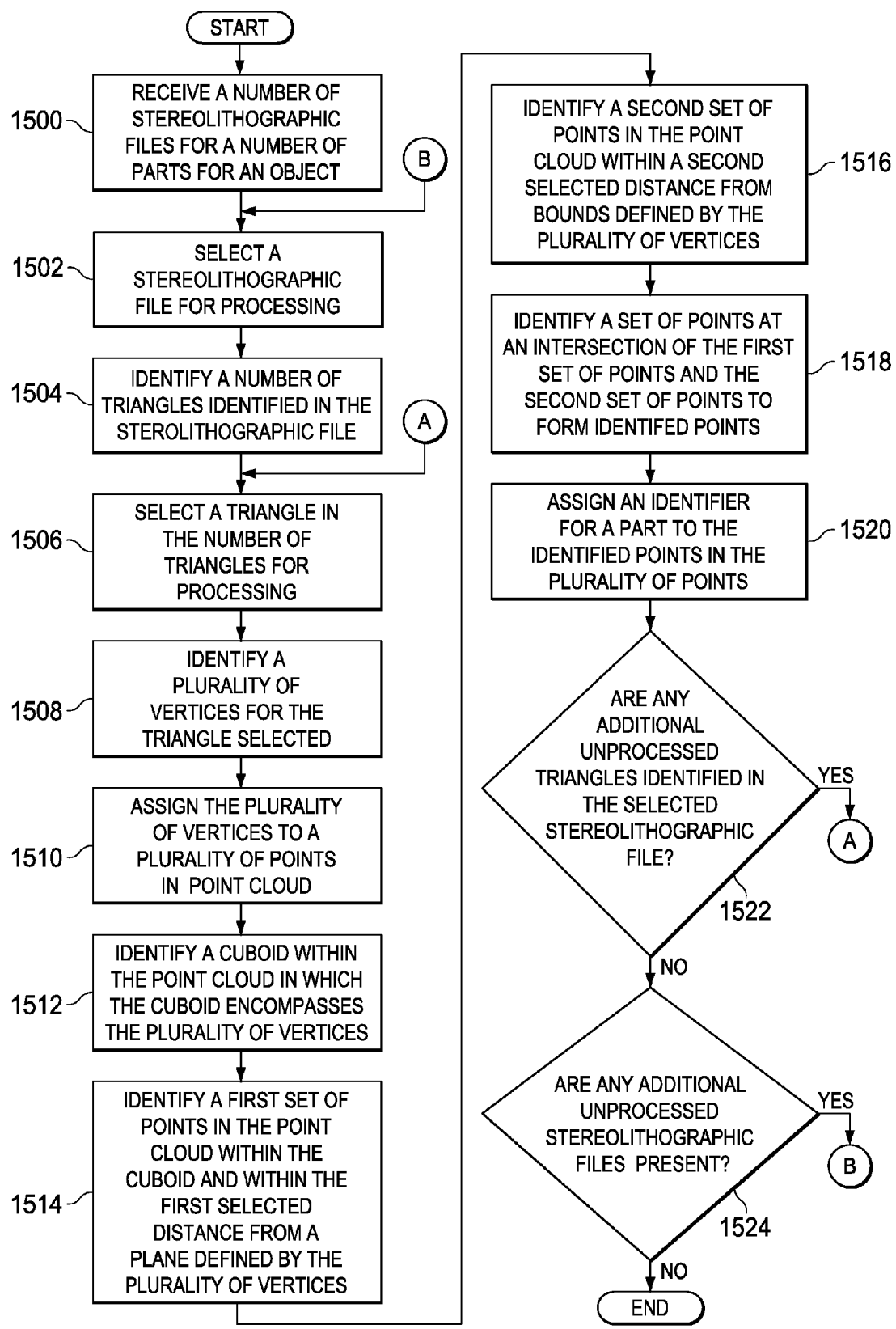
FIG. 15 is an illustration of a flowchart of a process for generating data for a point cloud in accordance with an illustrative embodiment.

With reference now to FIG. 15, an illustration of a flowchart of a process for generating data for a point cloud is depicted in accordance with an illustrative embodiment. The process illustrated in FIG. 15 may be implemented using point cloud generation system 700 in FIG. 7. In particular, this process may be implemented using point cloud generation process 716 in FIG. 7.

The process may begin by receiving number of stereolithographic files 712 for number of parts 652 for object 604 (operation 1500). The process may select a stereolithographic file for processing (operation 1502). Next, the process may identify number of triangles 720 identified in the stereolithographic file (operation 1504).

Thereafter, the process may select a triangle in number of triangles 720 for processing (operation 1506). The process may identify plurality of vertices 722 for the triangle selected (operation 1508).

The process may then assign plurality of vertices 722 to plurality of points 724 in point cloud 702 (operation 1510). Point cloud 702 may be comprised of points 726 on a three-dimensional grid 730. Three-dimensional grid 730 may be a uniformly spaced grid in these examples. In operation 1510, each vertex may be assigned to a point in point cloud 702 by assigning the vertex to the nearest point in point cloud 702.

Next, the process may identify a cuboid within point cloud 702 in which the cuboid encompasses plurality of vertices 722 (operation 1512). The process may identify first set of points 736 in point cloud 702 within the cuboid and within first selected distance 737 from plane 738 defined by plurality of vertices 722 (operation 1514). First selected distance 737 may be, for example, one grid unit spacing.

Thereafter, the process may identify second set of points 740 in point cloud 702 within second selected distance 741 from bounds 742 defined by plurality of vertices 722 (operation 1516). Second selected distance 741 from bounds 742 may be within bounds 742 or outside of bounds 742. Bounds 742 may be defined as the edges formed by plurality of vertices 722 in these examples.

The process may then identify set of points 743 at an intersection of first set of points 736 and second set of points 740 to form identified points 744 (operation 1518). Thereafter, the process may assign identifier 746 for a part to identified points 744 and the plurality of points 724 (operation 1520). The part may be the part for which the selected stereolithographic file was created.

Next, the process determines whether any additional unprocessed triangles may be identified in the selected stereolithographic file (operation 1522). If unprocessed triangles are present, the process returns to operation 1506 as described above. Otherwise, the process may determine whether any additional unprocessed stereolithographic files are present (operation 1524). If additional unprocessed stereolithographic files are present, the process may return to operation 1502 as described above. Otherwise, the process may terminate.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, without limitation, one or more of the blocks may be implemented as program code, in hardware, or a combination of the program code and hardware. When implemented in hardware, the hardware may, for example, without limitation, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 16, an illustration of a data processing system is depicted in accordance with an illustrative embodiment. Data processing system 1600 may be used to implement one or more computers in computer system 136 in FIG. 1. In this illustrative example, data processing system 1600 may include communications framework 1602, which provides communications between processor unit 1604, memory 1606, persistent storage 1608, communications unit 1610, input/output (I/O) unit 1612, and display 1614. In this example, communication framework 1602 may take the form of a bus system.

Processor unit 1604 may serve to execute instructions for software that may be loaded into memory 1606. Processor unit 1604 may be a number of processors, a multi-processor core, or some other type of processor, depending on the particular implementation.

Memory 1606 and persistent storage 1608 may be examples of storage devices 1616. A storage device may be any piece of hardware that is capable of storing information, such as, for example, without limitation, data, program code in functional form, and/or other suitable information either on a temporary basis and/or a permanent basis. Storage devices 1616 may also be referred to as computer readable storage devices in these illustrative examples. Memory 1606, in these examples, may be, for example, without limitation, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, may provide for communications with other data processing systems or devices. In these illustrative examples, communications unit 1610 may be a network interface card.

Input/output unit 1612 may allow for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 may provide a mechanism to display information to a user.

Instructions for the operating system, applications, and/or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions may be referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 may be located in a functional form on computer readable media 1620 that may be selectively removable and may be loaded onto or transferred to data processing system 1600 for execution by processor unit 1604. Program code 1618 and computer readable media 1620 may form computer program product 1622 in these illustrative examples. In one example, computer readable media 1620 may be computer readable storage media 1624 or computer readable signal media 1626.

In these illustrative examples, computer readable storage media 1624 may be a physical or tangible storage device used to store program code 1618 rather than a medium that propagates or transmits program code 1618.

Alternatively, program code 1618 may be transferred to data processing system 1600 using computer readable signal media 1626. Computer readable signal media 1626 may be, for example, without limitation, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1600 are not meant to provide architectural limitations to the manner in which different embodiments may be implemented. The different illustrative embodiments may be implemented in a data processing system including components in addition to and/or in place of those illustrated for data processing system 1600. Other components shown in FIG. 16 may be varied from the illustrative examples shown. The different embodiments may be implemented using any hardware device or system capable of running program code 1618.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 may take place. Thereafter, aircraft 1800 may go through certification and delivery 1710 in order to be placed in service 1712. While in service 1712 by a customer, aircraft 1800 may be scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 may be produced by aircraft manufacturing and service method 1700 in FIG. 17 and may include airframe 1802 with plurality of systems 1804 and interior 1806. Examples of systems 1804 may include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. An illustrative embodiment may be employed during one of the stages to program programmable components in aircraft 1800.

In one illustrative example, components or subassemblies produced in component and subassembly manufacturing 1706 in FIG. 17 may be fabricated or manufactured in a manner similar to components or subassemblies produced while aircraft 1800 may be in service 1712 in FIG. 17.

As yet another example, one or more apparatus embodiments, method embodiments, or a combination thereof may be utilized during production stages, such as component and subassembly manufacturing 1706 and system integration 1708 in FIG. 17 to program programmable components for aircraft 1800. One or more apparatus embodiments, method embodiments, or a combination thereof may be utilized by programming unit 114 in FIG. 1 and may be used to program programmable components in aircraft 1800 while aircraft 1800 may be in service 1712 and/or during maintenance and service 1714 in FIG. 17. The use of a number of the different illustrative embodiments may substantially expedite the assembly of and/or reduce the cost of aircraft 1800.

The description of the different illustrative embodiments has been presented for purposes of illustration and description and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a programmable component, the method comprising:
   identifying a location on an object using a programming unit based on a position of the programming unit with respect to the object;
   identifying an association between the location on the object and a number of points in a point cloud for the object, wherein the number of points in the point cloud is associated with a component identification stored in a database;
   identifying programming information for the programmable component using the component identification associated with the number of points in the point cloud and the database; and
   programming the programmable component using the programming information for the programmable component.

2. The method of claim 1, wherein identifying the location on the object comprises:
   identifying the location on the object using the position of the programming unit with respect to the object and a distance between the programming unit and the location on the object.

3. The method of claim 1, wherein identifying the location on the object comprises:
   pointing the programming unit at the location on the object; and
   identifying the location on the object using the position of the programming unit with respect to the object with the programming unit pointed at the object.

4. The method of claim 1, wherein programming the programmable component using the programming information for the programmable component comprises:
   sending the programming information to the programmable component over a communications link with the programmable component.

5. The method of claim 1, wherein programming the programmable component using the programming information for the programmable component comprises:
   sending the programming information to the programmable component by a human operator.

6. The method of claim 1 further comprising:
   associating identifier information for the programmable component with at least one of the location on the object, the component identification, and the number of points in the point cloud.

7. The method of claim 1 further comprising:
installing the programmable component at the location on the object after programming the programmable component using the programming information for the programmable component.

8. The method of claim 1 further comprising:
obtaining identifier information for the programmable component over a communications link established with the programmable component, wherein the identifier information comprises at least one of a media access code, a serial number, a part number, a processor serial number, a model number, an identification of a type of component, and a code.

9. The method of claim 1, wherein the programming information comprises at least one of an identifier, a control code, a program, and a configuration file.

10. The method of claim 1, wherein the programmable component is a first programmable component that interacts with a second programmable component and wherein the programming information configures the first programmable component to interact with the second programmable component.

11. The method of claim 1, wherein the programmable component is selected from one of a switch, a sensor, an in-flight entertainment unit, a light, and a controller.

12. An apparatus comprising:
a programming unit configured to identify a location on an object based on a position of the programming unit with respect to the object; and
a component manager configured to identify an association between the location on the object and a number of points in a point cloud for the object, wherein the number of points in the point cloud is associated with a component identification stored in a database; and identify programming information for the programmable component using the component identification associated with the number of points in the point cloud and the database; and program the programmable component using the programming information for the programmable component.

13. The apparatus of claim 12, wherein in being configured to identify the location on the object based on the position of the programming unit with respect to the object, the programming unit is configured to identify the location on the object using the position of the programming unit with respect to the object and a distance between the programming unit and the location on the object.

14. The apparatus of claim 12, wherein the programming unit is configured to be pointed at the location on the object to identify the location on the object using the position of the programming unit with respect to the object.

15. The apparatus of claim 12, wherein in being configured to program the programmable component using the programming information for the programmable component, the component manager is configured to send the programming information to the programmable component from the programming unit over a communications link between the programming unit and the programmable component.

16. The apparatus of claim 12, wherein in being configured to program the programmable component using the programming information for the programmable component, the component manager is configured to send the programming information to a portable storage device in which a human operator is configured to transfer the programming information from the portable storage device to the programmable component.

17. The apparatus of claim 12, wherein the component manager is further configured to associate identifier information for the programmable component with at least one of the location on the object, the component identification, and the number of points in the point cloud.

18. The apparatus of claim 12, wherein the programming unit is further configured to obtain identifier information for the programmable component over a communications link established with the programmable component.

19. The apparatus of claim 18, wherein the identifier information is selected from at least one of a media access code, a serial number, a part number, a processor serial number, a model number, an identification of a type of component, and a code.

20. The apparatus of claim 12, wherein the programming information comprises at least one of an identifier, a control code, a program, and a configuration file.

21. The apparatus of claim 12, wherein the programmable component is a first programmable component that interacts with a second programmable component and wherein the programming information configures the first programmable component to interact with the second programmable component.

22. The apparatus of claim 12, wherein the programmable component is selected from one of a switch, a sensor, an in-flight entertainment unit, a light, and a controller.

23. A method for programming a programmable component in an aircraft, the method comprising:
pointing a programming unit at a location on an object in the aircraft;
identifying the location on the object based on a position of the programming unit pointed at the programmable component and a distance between the programming unit and the location on the object;
identifying programming information for the programmable component based on the location on the object by:
identifying an association between the location on the object and a number of points in a point cloud for the object in which the number of points in the point cloud is associated with a component identification stored in a database; and
identifying the programming information for the programmable component using the component identification associated with the number of points in the point cloud and the database in which the programming information comprises at least one of an identifier, a control code, a program, and a configuration file;
programming the programmable component using the programming information for the programmable component by sending the programming information to the programmable component over a communications link with the programmable component or sending the programming information to the programmable component by a human operator in which the programmable component is selected from one of a switch, a sensor, an in-flight entertainment unit, a light, and a controller; and
obtaining identifier information for the programmable component over the communications link established with the programmable component, wherein the identifier information comprises at least one of a media access code, a serial number, a part number, a processor serial number, a model number, an identification of a type of component, and a code.

24. An aircraft component programming system comprising:
- a programming unit configured to be pointed at a location on an object in an aircraft; identify the location on the object based on a position of the programming unit with respect to the object; and obtain identifier information for a programmable component over a communications link established with the programmable component in which the programmable component is selected from one of a switch, a sensor, an in-flight entertainment unit, a light, and a controller and in which the identifier information is selected from at least one of a media access code, a serial number, a part number, a processor serial number, a model number, an identification of a type of component, and a code; and
- a component manager configured to identify programming information for the programmable component based on the location on the object by identifying an association between the location on the object and a number of points in a point cloud for the object in which the number of points in the point cloud is associated with a component identification stored in a database and identifying the programming information for the programmable component using the component identification associated with the number of points in the point cloud and the database in which the programming information comprises at least one of an identifier, a control code, a program, and a configuration file; and program the programmable component using the programming information for the programmable component by sending the programming information to the programmable component over the communications link established with the programmable component or sending the programming information to the programmable component by a human operator.

* * * * *